(12) United States Patent
Mnich

(10) Patent No.: US 11,742,766 B2
(45) Date of Patent: Aug. 29, 2023

(54) WELDING POWER SUPPLY WITH EXTENDED VOLTAGE CHARACTERISTIC

(71) Applicant: ESAB AB, Gothenburg (SE)

(72) Inventor: Andrzej Mnich, Opole (PL)

(73) Assignee: ESAB AB, Gothenburg (SE)

( * ) Notice: Subject to any disclaimer, the term of this patent is extended or adjusted under 35 U.S.C. 154(b) by 233 days.

(21) Appl. No.: 17/194,612

(22) Filed: Mar. 8, 2021

(65) Prior Publication Data

US 2021/0305902 A1  Sep. 30, 2021

Related U.S. Application Data

(63) Continuation of application No. 15/990,963, filed on May 29, 2018, now Pat. No. 10,944,328, which is a
(Continued)

(51) Int. Cl.
*H02M 3/335* (2006.01)
*B23K 9/10* (2006.01)
(Continued)

(52) U.S. Cl.
CPC ......... *H02M 3/33576* (2013.01); *B23K 9/092* (2013.01); *B23K 9/1043* (2013.01);
(Continued)

(58) Field of Classification Search
CPC .... B23K 9/092; B23K 9/1043; B23K 9/1062; B23K 9/16; H02M 3/33576; H02M 1/083; H02M 1/0009; H02M 3/285
See application file for complete search history.

(56) References Cited

U.S. PATENT DOCUMENTS

| 5,229,567 A | 7/1993 | Kobayashi et al. |
| 7,894,213 B2 | 2/2011 | Zhao et al. |
(Continued)

FOREIGN PATENT DOCUMENTS

| CN | 102035395 A | 4/2011 |
| CN | 102299652 A | 12/2011 |
(Continued)

OTHER PUBLICATIONS

Machine Translation of Sasaki, JP 2000-023455, Performed Dec. 19, 2022 (Year: 1998).*
(Continued)

*Primary Examiner* — Brian W Jennison
(74) *Attorney, Agent, or Firm* — Edell, Shapiro & Finnan, LLC

(57) ABSTRACT

An apparatus to provide welding power. The apparatus may include a direct current-alternate current (DC-AC) power converter to output a primary current and a transformer stage. The transformer stage may include at least one power transformer to receive the primary current from the (DC-AC) power converter on a primary side of the transformer stage and to output a first voltage through a first rectifier and a first set of secondary windings disposed on a secondary side of the transformer stage. The transformer stage may further include an auxiliary set of secondary windings disposed on the secondary side to output a second voltage. The apparatus may also include a pair of active unidirectional switches disposed on the secondary side to receive the second voltage from the auxiliary set of secondary windings.

19 Claims, 17 Drawing Sheets

Related U.S. Application Data continuation of application No. PCT/IB2015/059601, filed on Dec. 14, 2015.

(51) Int. Cl.
*B23K 9/09* (2006.01)
*B23K 9/16* (2006.01)
*H02M 1/08* (2006.01)
*H02M 3/28* (2006.01)
*H02M 1/00* (2006.01)

(52) U.S. Cl.
CPC .............. *B23K 9/1062* (2013.01); *B23K 9/16* (2013.01); *H02M 1/083* (2013.01); *H02M 1/0009* (2021.05); *H02M 3/285* (2013.01)

(56) References Cited

U.S. PATENT DOCUMENTS

| | | | |
|---|---|---|---|
| 2002/0056708 A1 | 5/2002 | Moriguchi et al. | |
| 2005/0145611 A1 | 7/2005 | Blankenship et al. | |
| 2005/0276085 A1 | 12/2005 | Winn | |
| 2012/0081933 A1 | 4/2012 | Garrity | |
| 2013/0051083 A1 | 2/2013 | Zhao | |
| 2014/0021180 A1* | 1/2014 | Vogel | B23K 9/1062 219/130.1 |
| 2014/0374398 A1* | 12/2014 | Manthe | B23K 9/1006 219/130.21 |
| 2015/0029758 A1* | 1/2015 | Jacobson | H02M 3/33576 363/17 |
| 2015/0381067 A1 | 12/2015 | Choi et al. | |

FOREIGN PATENT DOCUMENTS

| | | |
|---|---|---|
| CN | 102510228 A | 6/2012 |
| CN | 103081321 A | 5/2013 |
| CN | 103633847 A | 3/2014 |
| CN | 105075092 | 11/2015 |
| EP | 2953250 A1 | 12/2015 |
| JP | H0731140 A | 1/1995 |
| JP | 2000023455 A | 1/2000 |
| JP | 2005103569 A | 4/2005 |
| WO | 2015040517 | 3/2015 |

OTHER PUBLICATIONS

International Preliminary Report and Written Opinion of International Application PCT/IB2015/059601 dated Jun. 19, 2018, 8 pages.
International Preliminary Report and Written Opinion of International Application PCT/IB2016/057363 dated Jun. 19, 2018, 10 pages.
Examination Report No. 1 from the Australian Government/IP Australia for Australian Patent Application No. 2015417472 dated Nov. 26, 2018, 4 pages.
Chinese Office Action in corresponding Chinese Application No. 201580085321.9, dated Jul. 1, 2019, 21 pages with English Translation.
Extended European Search Report for European Patent Application No. 19203567.3 from the European Patent Office dated Jan. 29, 2020, 7 pages.
Notification of Second Office Action for Chinese Patent Application No. 201580085321.9 dated Jan. 22, 2020 with English translation, 16 pages.

* cited by examiner

WELDING POWER SUPPLY WITH EXTENDED VOLTAGE CHARACTERISTIC

CROSS-REFERENCE TO RELATED APPLICATIONS

This is a Continuation of U.S. patent application Ser. No. 15/990,962 filed on May 29, 2018, which is a continuation of PCT/IB2015/059601 filed on Dec. 14, 2015, the entire disclosures of which are incorporated by reference herein in their entirety.

TECHNICAL FIELD

The present embodiments are related to power supplies for welding type power, that is, power generally used for welding, cutting, or heating.

BACKGROUND

In welding apparatus, power supplies are often configured to deliver constant voltage output while covering a certain range of output current. The static output volt-amp characteristic may include a horizontal line representing constant voltage and a vertical line, corresponding to the current limit. Moreover, welding power supplies, in particular, switched mode power supplies, have certain requirements, imposed by physics of welding process. Instead of delivering a current-voltage-characteristics in form of a horizontal and vertical line, a welding power supplies may be more useful if capable of covering the range from almost zero to a maximum voltage and from almost zero to a maximum current. In other words, a welding power supply may be targeted to cover the entire rectangular plane on the output volt-amp characteristic.

Notably, in operation, it may not be necessary that the maximum voltage and the maximum current are delivered at the same moment. The control system of a welding power supply may, for example, limit the output voltage at high current and limit the output current at high voltage. The control system may be configured to generate a power limitation having a shape such as a hyperbola or other complex current-voltage limitations, created by feedback and feedforward control circuits. These limitations in the control are merely superimposed over limits defined by the invariable ratio of the transformer. If covering the high voltage at low current is targeted for a given application, this leads to a low transformer ratio, while power conversion may be ineffective at big currents where high voltage is not needed. These considerations may decrease the effectiveness of a power supply design, especially in the case of welding by means of cellulosic electrodes. Welding using cellulosic electrodes entails very high current at short circuits, and a long extension of the electric arc, thus entailing high voltage at low or moderate currents.

Any solution that provides multiple power supplies to address the aforementioned problems of providing a targeted output range of voltage and current is to be compared on a practical basis with a simple approach, where the output voltage-ampere characteristic is limited just by a control system. In general, there is no obvious conclusion whether designs having two power supplies are more or less economically effective than a solution having the current-voltage limitations imposed by a control system. The best choice may depend on a particular solution or application and on the relation between the rated current operating point and the voltage margin in the low current region.

It is with respect to these and other considerations that the present disclosure is provided.

BRIEF SUMMARY

In one embodiment, an apparatus to provide welding power. The apparatus may include a direct current-direct current (DC-DC) power converter. The DC-DC converter may comprise direct current to alternate current converter (DC-AC) to output a primary current and a transformer stage. The transformer stage may include at least one power transformer to receive the primary current from the DC-AC power converter on a primary side of the transformer stage and to output a first voltage through a first set of secondary windings disposed on a secondary side of the transformer stage. The first set of secondary winding may output the current to the first rectifier that converts alternate current to direct current. The apparatus may further include an auxiliary set of secondary windings disposed on the secondary side to output a second voltage; an auxiliary rectifier and a pair of active switches disposed on the secondary side to receive the second voltage from the auxiliary set of secondary windings.

In a further embodiment, an apparatus to provide welding power may include a main DC-DC power converter, where the main power converter has a first output. The apparatus may also include a main power transformer coupled to receive the first output at main primary windings of the main power transformer and to generate a main power output through main secondary windings of the main power transformer and further through the main output rectifier. The apparatus may further include an auxiliary DC-DC power converter, where the auxiliary DC-AC power converter having a second output, and an auxiliary power transformer coupled to receive the second output at auxiliary primary windings of the auxiliary power transformer, and to generate an auxiliary power output through auxiliary secondary windings of the auxiliary power transformer and further through the auxiliary and main output rectifiers. The outputs of the rectifiers may be electrically connected in series. The main DC-DC power converter and the auxiliary DC-DC power converter may be a two-switch forward converter or other power converter operating with limited duty cycle of PWM signal and then output rectifiers may be connected in parallel.

In another embodiment, a method of controlling welding power may include sending a first and second pulse width modulated (PWM) signals to a DC-AC power converter-to output a primary current to a primary side of a main power transformer stage. The method may further include measuring the primary current, the secondary current, various currents in separate secondary circuits, the combination and derivatives of the aforementioned current measurements or the reference current from the internal feedback loop, to generate a sensed current value; and when the sensed current value is below a certain first threshold value, activating a first secondary switch disposed on a secondary side of the main power transformer stage using a third a fourth PWM signal, respectively. The method may further include the modulation of a third and fourth PWM by the principle of the leading edge modulation wherein the leading edge is delayed and the delay decreases from the maximum at the first threshold value of the sensed current down to zero at another second threshold value of the sensed current.

In another embodiment, a method of controlling welding power may include sending PWM signals to a two-switch forward DC-AC power converter or another power converter operating with the limited maximum duty cycle to output a primary current to a primary side of a main power transformer stage. The method may further include measuring the primary current, the secondary current, various currents in separate secondary circuits, the combination and derivatives of the aforementioned current measurements or the reference current from the internal feedback loop, to generate a sensed current value; and when the sensed current value is below a first threshold value, activating the second two-switch forward DC-AC power converter or another power converter operating with the limited maximum duty cycle to output a primary current to a primary side of a auxiliary power transformer stage using another set of PWM signals.

The method may further include the modulation of PWM control of the second DC-AC converter by the principle of the leading edge and lagging modulation in a way that the leading edge is delayed and the delay decreases from the maximum at the first threshold value of the sensed current down to zero at another second threshold value of the sensed current.

DETAILED DESCRIPTION

Figure 1:
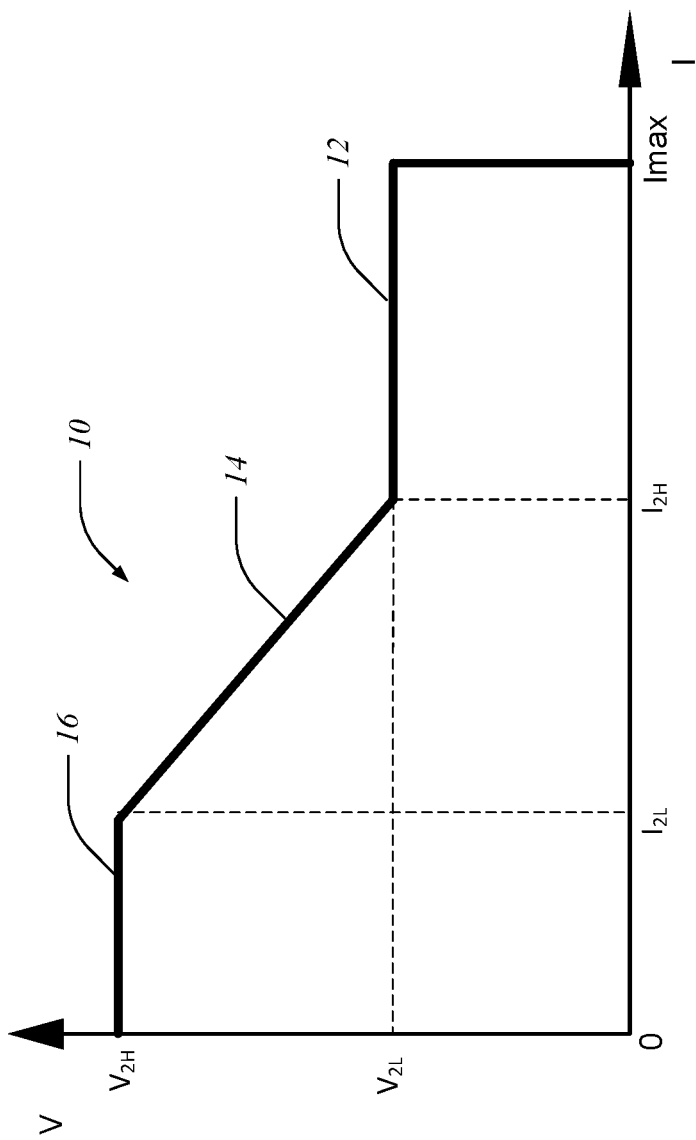
FIG. 1 depicts a circuit diagram of an exemplary maximum voltage-current characteristic output by embodiments of the disclosure.

The present embodiments provide improvements over known apparatus used to provide welding type power, which may be referred to herein as "welding apparatus." In accordance with various embodiments, welding power supplies are provided with extended voltage characteristics.

In various embodiments, a DC-DC power converter (or power converter) is provided based on a full bridge or equivalent topology (such as a half-bridge, three level, double two-switch forward). In various embodiments, the power converter may be equipped with active switches on the secondary side of the converter, where the active switches introduce additional voltage to an output circuit, the additional voltage being generated from additional windings, either of the same transformer or from an additional transformer. In some embodiments, the additional transformer is connected to the same voltage converter. In various additional embodiments, a main power converter is a two-switch forward converter or other power converter operating with the limited maximum PWM duty cycle. Extended voltage is provided by application of an additional low power converter, operating in opposite phase timing with respect to the main converter. The auxiliary power converter is a two-switch forward converter or other power converter operating with the limited maximum PWM duty cycle. As an example, an auxiliary power converter may be configured to receive a set of PWM signals having a first phase and the main power converter is configured to receive a set of PWM signals having a second phase opposite the first phase.

Various embodiments of the disclosure may operate using a same general control principle. In particular, the main converter and its switches may operate with pulse width modulation (PWM) control, in particular the modulation of the lagging edge of the active energy transfer pulse. In different methods of the disclosure, PWM feedback control can be applied so the lagging edge is modulated. In different variants, control may operate under peak current mode, average current mode, constant on-time, or voltage control mode. For control of additional switches (in an additional converter, or on the secondary side) the leading edge may also be modulated, by the implementation of controlled time delay. In some embodiments, the delay may be inversely proportional to the actual primary current, secondary current, and combinations of different currents in the converter or the reference current from the internal feedback loop.

In operation, for current greater than a certain high threshold value, the time delay of the leading edge of the operation of the additional switches may be more than the half of the switching period, meaning the additional switches are not activated at all. In accordance with various embodiments, for current lower than the high threshold value the delay is proportionally decreased and decreases to zero at a certain low threshold value of the current. Below the low threshold value of current additional switches may be activated without delay. In various embodiments, the lagging edge of the control signal of the auxiliary switches may be modulated in the same way as for the switches of the main converter, by the same control principle. In particular embodiments where the topology includes secondary switches just the leading edge may be modulated, which may be more effective. In this case the secondary switch may be switched off at a given time after the beginning of the opposite phase. Accordingly, the switching off process is carried out with no current (zero current switching ZCS).

In the range of current values below the high threshold value $I_{2H}$ and the output voltage below a certain level, the apparatus is capable of providing a target voltage level while not using additional components. In such instances additional switches or an auxiliary converter may be switched off by a discrete operation, or, by the continuous operation through the gradual increase of the delay of the leading edge of the control signal of the auxiliary switches or auxiliary converter.

FIG. 1 depicts general-voltage-current characteristics provided by apparatus arranged according to the present embodiments. The FIG. 1 shows an exemplary simplified maximum average voltage-current curve (VI) 10 generated by apparatus of the embodiments of the present disclosure. The VI curve 10 includes a low voltage portion 12 where output voltage is maintained at a relatively low value and constant value over a range of current between the maximum current Imax and a certain current value, shown as a first threshold value $I_{2H}$. The VI curve 10 also includes a variable voltage portion 14, where voltage increases with decreasing current between $I_{2H}$ and a second threshold value $I_{2L}$. The VI curve also includes a high voltage portion 16 where the voltage is relatively high and relatively constant below $I_{2L}$.

Figure 2:
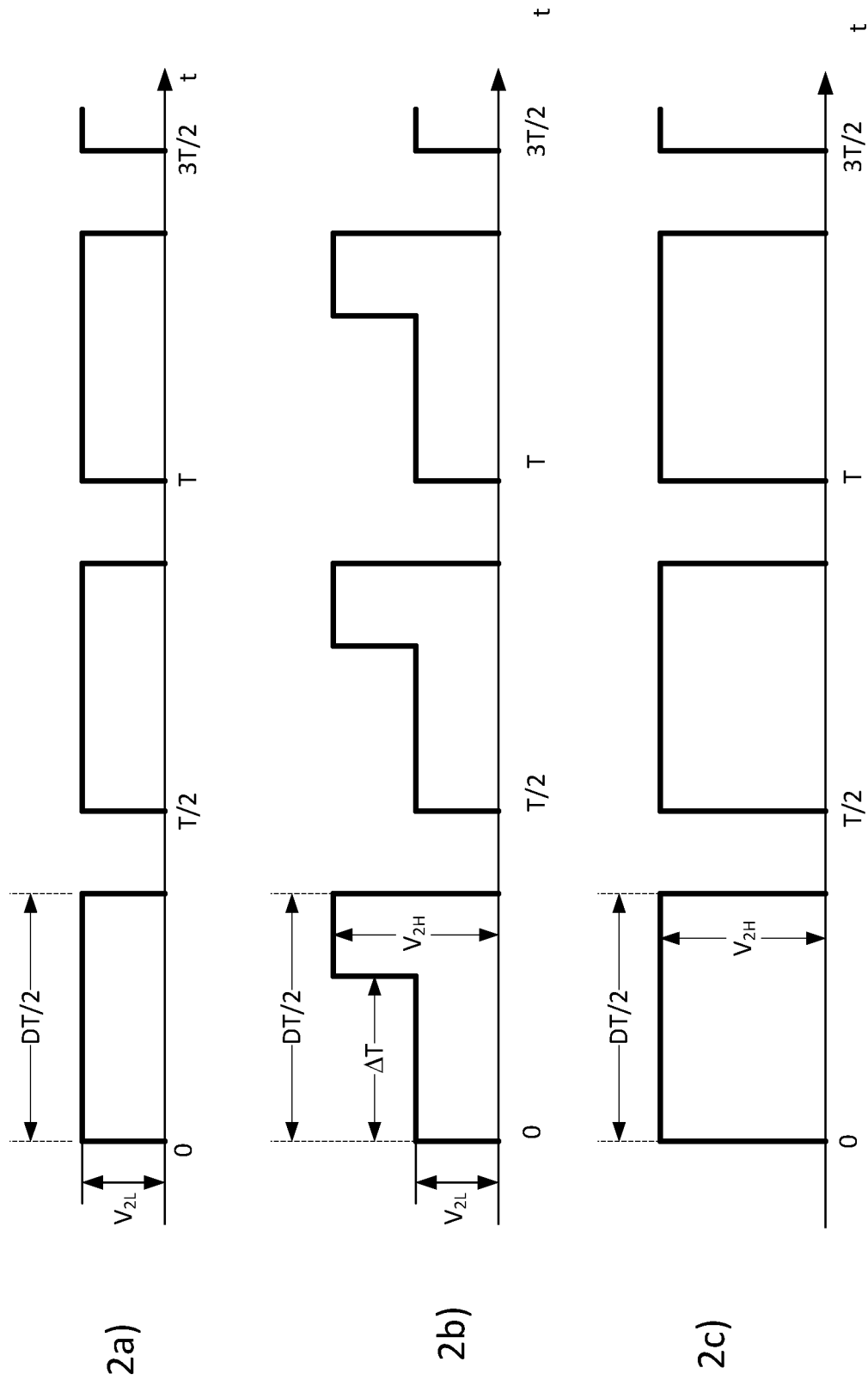
FIG. 2 and FIG. 3 depict the time diagrams of the output voltage of different embodiments of the disclosure.

FIG. 2 shows time diagram of the output voltage in embodiment which employs switches on the secondary side. Diagram 2a) shows the output voltage at current laying over the high threshold value $I_{2H}$. Just the low voltage level $V_{2L}$ appears. The PWM modulation is created on the principle of lagging edge modulation. Diagram 2b) shows the output voltage for current values between the high $I_{2H}$ and low $I_{2L}$ thresholds. The high $V_{2H}$ and low $V_{2L}$ voltage levels are present. The leading and the lagging edges of the high voltage portion are modulated. Diagram 2c) shows the output voltage at current values below the low threshold value $I_{2L}$. Just the high voltage level $V_{2H}$ appears. The PWM modulation is created on the principle of lagging edge modulation.

Figure 3:
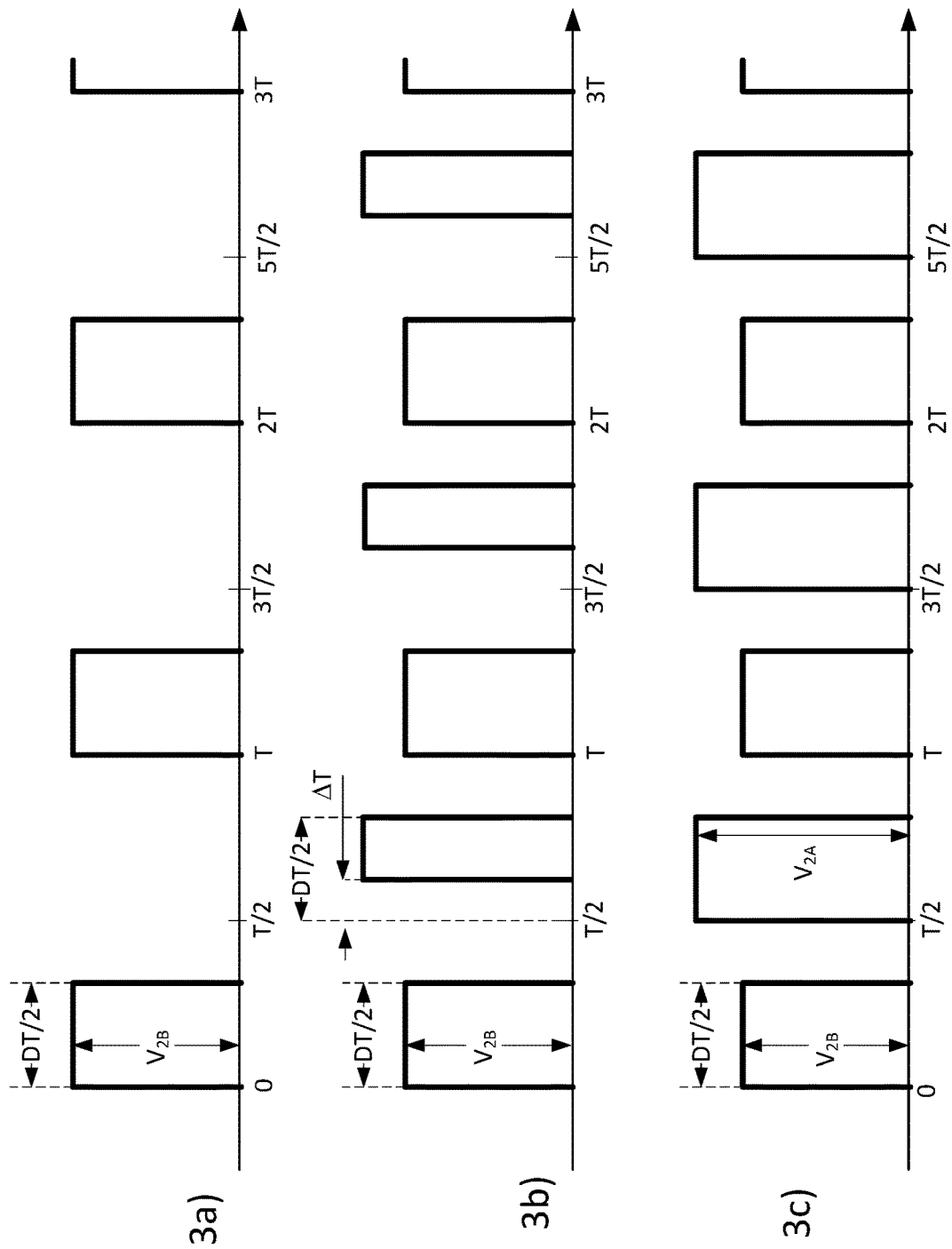

FIG. 3 shows a time diagram of the output voltage in an embodiment employing a main DC-DC power converter is a two-switch forward converter or other power converter operating with the limited maximum PWM duty cycle and similar auxiliary converter. Diagram 3a) shows the output voltage at current greater than the high threshold value $I_{2H}$. The PWM modulation is created on the principle of lagging edge modulation with the limited maximum duty cycle. Diagram 3b) shows the output voltage for current values between the high $I_{2H}$ and low $I_{2L}$ thresholds. Every second pulse is PWM modulated with modulation of the lagging edge. Every second pulse from the series shifted a half of period is PWM modulated with the modulation of the leading and the lagging edges. Diagram 3c) shows the output voltage at current values below the low threshold value $I_{2L}$. The PWM modulation is create on the principle of the lagging edge modulation with double frequency in respect to the instance of the current over high threshold.

Figure 4:
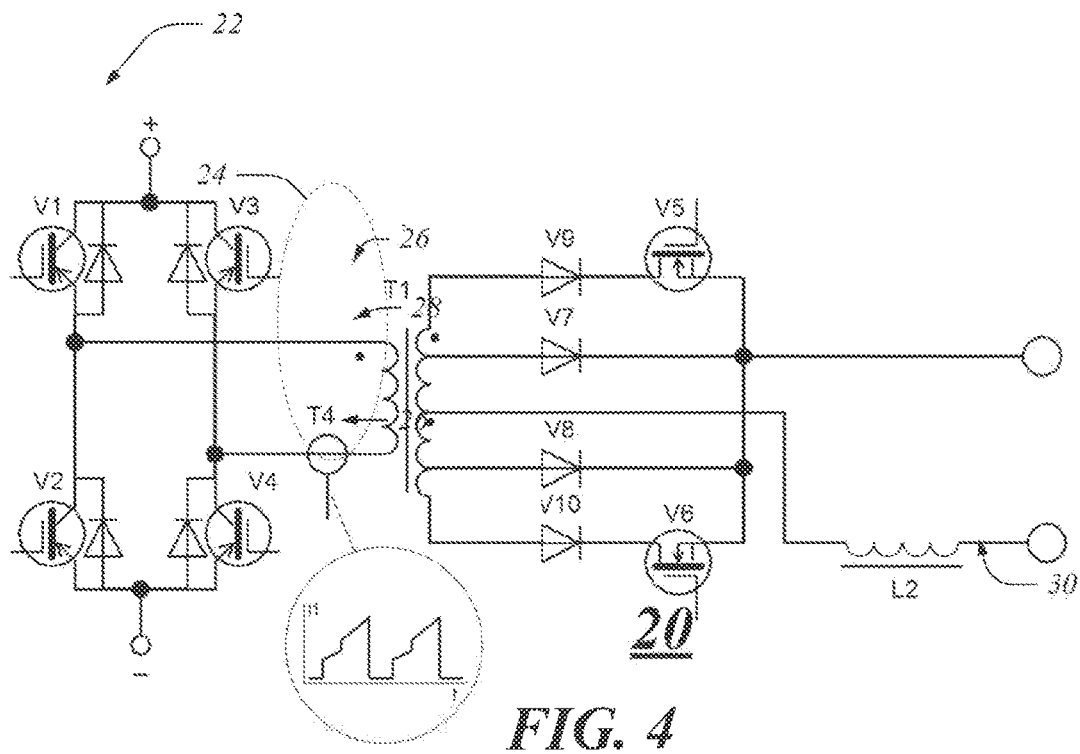
FIG. 4 depicts a circuit diagram of an exemplary apparatus.

FIG. 4 shows a circuit diagram of a power supply 20 according to embodiments of the disclosure. The power supply 20 includes various known components. The components of FIG. 2 and the figures to follow are listed in Table I for reference. As shown in FIG. 4, a direct current-alternate current (DC-AC) power converter 22 is arranged with a plurality of switches, shown as V1, V2, V3, V4.

TABLE I

| | References used in the drawings |
|---|---|
| A1...4 | Drivers of the main primary switches |
| A11...13 | Summing nodes |
| A14 | Amplifier/attenuator |
| A15 | Leading edge modulation comparator |
| A16 | Amplifier/attenuator of the compensation ramp |
| A17 | Average current feedback amplifier |
| A18, 19 | Lagging edge modulation comparators |
| A20 | Feedback amplifier |
| A21 | Current sense amplifier |
| A22 | Primary current sense modifier |
| A23 | Summing node |
| A24 | Integrator or other astatic regulator |
| A5, 6 | Drivers of the auxiliary (secondary or primary) switches |
| A5, 6 | Drivers of the secondary primary switches |
| A7, 8 | Current amplifiers/attenuators |
| A9, 10 | Current sense low pass filters |
| C1 | Capacitor for DC voltage balance |
| D1, 2 | AND logic gates |
| D3, 4 | RS triggers |
| D5 | OR logic gate |
| D6 | Logic inverter |
| D8 | PWM Lagging edge trigger |
| D9 | OR logic gate |
| D10 | Threshold reference pulse generator |
| L2 | Secondary inductor |
| L9, 10 | Commutation inductances (or commutation leakage inductances) |
| N1 | PWM controller |
| S1, 2 | Voltage controlled switches |
| S3 | Voltage controlled switch. normally open |
| S4 | Voltage controlled switch. normally closed |
| T1 | Main converter transformer |
| T2 | Auxiliary converter transformer |
| T3 | Secondary current sensor |

TABLE I-continued

| | References used in the drawings |
|---|---|
| T4, T14 | Primary current sensors |
| T5, 6 | Secondary auxiliary current sensors |
| V02.03.012.013 | |
| V1...4 | Primary switches of the main converter |
| V11...14 | Primary switches of the auxiliary converter |
| V20 | Rectifier function, rectify signal of positive value |
| V21 + V22 | Concurrent rectifier |
| V23 + V24 | Concurrent rectifier |
| V5, 6 | Secondary power switches |
| V7, 8 | Main secondary rectifiers |
| V9...12 | Auxiliary secondary rectifiers |
| & | And logic funtion |
| ≥1 | Or logic function |
| COMP | comparator |
| CS | Current sense input |
| Dtsh | Threshold reference value of PWM duty cycle |
| EA | Error amplifier |
| EAO, EAO' | Error amplifier outputs |
| FB_I | Current feedback |
| FB_U | Voltage feedback |
| I1 | Primary current signal |
| I2 | Secondary current signal |
| Iav | Average current reference |
| Ipeak | Peak current reference |
| $I_{2L}$ | Second threshold current value (low) |
| $I_{2H}$ | First threshold current value (high) |
| K1...4 | Coefficients of amplification attenuation |
| OSC | Oscillator signal double frequency of conversion |
| OFF | Disable integrator signal |
| PWM_A | PWM signal phase A, lagging edge modulated |
| PWM_B | PWM signal phase B, lagging edge modulated |
| PWM_C | PWM signal phase A, lagging & leading edge modulated |
| PWM_C' | PWM signal phase A, leading edge modulated |
| PWM_D | PWM signal phase B, lagging & leading edge modulated |
| PWM_D' | PWM signal phase B, leading edge modulated |
| RAMP | Ramp signal from the oscillator |
| RELOAD | Reload signal to integrator |
| V2A | Peak voltage of the auxiliary converter |
| V2B | Peak voltage of the basic converter |
| V2L | Low level of the peak voltage |
| V2H | High level of the peak voltage |
| z1, z11 | Primary windings |
| z2, z21, z22, z31, z32 | Secondary windings |

In some embodiments these switches may be insulated gate bipolar transistors (IGBT) or MOSFET transistors as in known converters. In the embodiment shown in FIG. 4, the switches may be arranged in a full bridge configuration. The DC-AC power converter 22, acting as a main DC-AC power converter, in this and other embodiments may be arranged to receive a first dc voltage, where the first DC voltage may be a rectified voltage based upon an input voltage from an AC power source (not shown). The DC-AC power converter 22 may output an ac voltage whose magnitude is determined by operation of the switches V1, V2, V3, V4. As detailed below the switches V1, V2, V3, V4, may be controlled by pulse width modulation (PWM) signals generated by a pulse width modulator (not separately shown).

As further shown in FIG. 4, the power supply 20 may further include a transformer stage 24. In various embodiments, the transformer stage 24 may include at least one power transformer to receive the ac voltage on a primary side of the transformer stage and to output a second ac voltage through a first set of secondary windings disposed on a secondary side of the transformer stage. In the particular embodiment illustrated in FIG. 4, just one, main transformer is shown, as T1. As shown in this embodiment the transformer stage 24 includes a first set of secondary windings 28 and an auxiliary set of secondary windings 26. The second set of secondary windings 26 may be employed to extend the voltage range for welding output as detailed below. For example, under certain operation conditions, the first set of secondary windings may output a second ac voltage to rectifier V7, V8 to output dc voltage used for welding, based upon the input received from the DC-AC power converter 22. Under other conditions, a third ac voltage from the auxiliary set of secondary windings 26 may be harnessed to another rectifier to increase the welding dc voltage.

As further illustrated in FIG. 4, the power supply 20 may include a pair of active active unidirectional switches disposed on the secondary side to receive the second ac voltage from the auxiliary set of secondary windings 26. This pair of active switches may rectify ac voltage and output the dc voltage to a weld station 30. The first unidirectional active switch is shown as serial connection of rectifier V9 and active switch V5. The second unidirectional active switch is shown as serial connection of rectifier V10 and active switch V6. In general, an active unidirectional switch may be embodied as just one device.

Figure 5:
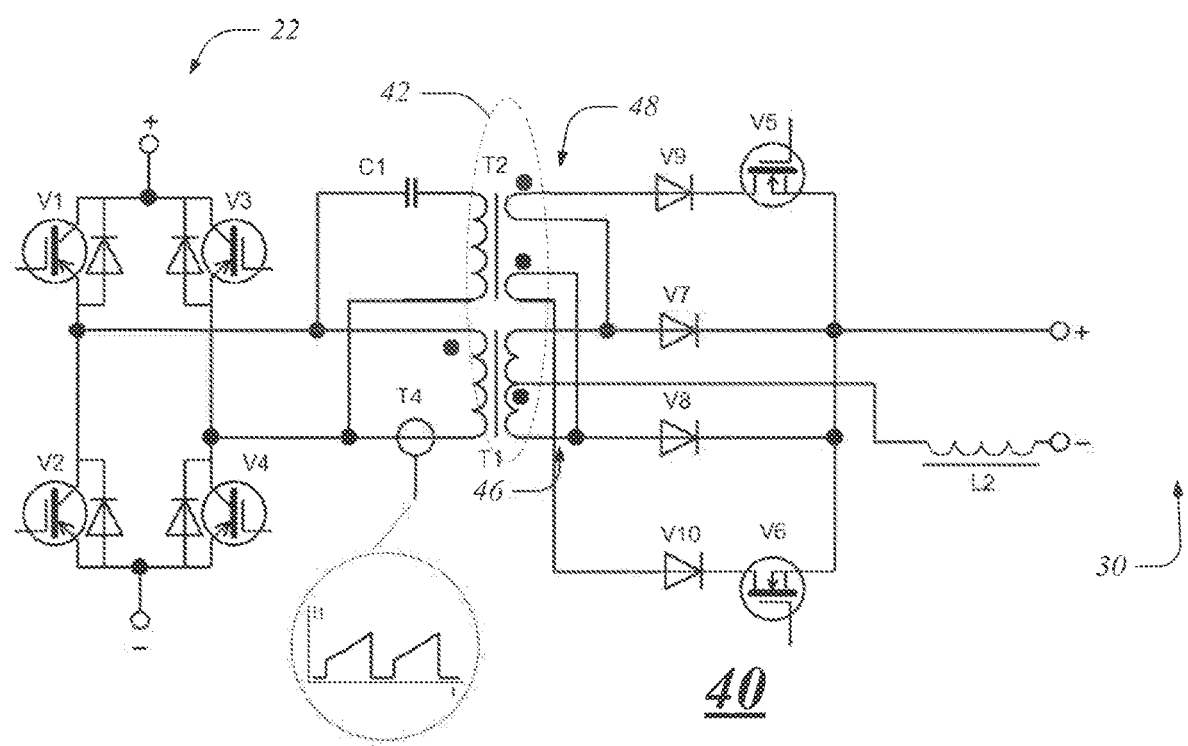
FIG. 5 depicts a circuit diagram of another exemplary apparatus.

FIG. 5 shows a circuit diagram of a power supply 40 according to embodiments of the disclosure. The power supply 40 includes various known components, as set forth in Table I., for example. In the arrangement of FIG. 5, the power supply 40 may include, in addition to the DC-AC power converter 22, a transformer stage 42. In this embodiment the transformer stage 42 includes a main converter transformer T1 and auxiliary converter transformer T2. As shown in this embodiment the transformer stage 42 includes a first set of secondary windings 46 coupled to the main converter transformer T1 and an auxiliary set of secondary windings 48 coupled to the auxiliary converter transformer T2. The second set of secondary windings 48 may be employed to extend the voltage range for welding output as detailed below and generally described above with respect to FIG. 2.

Figure 6:
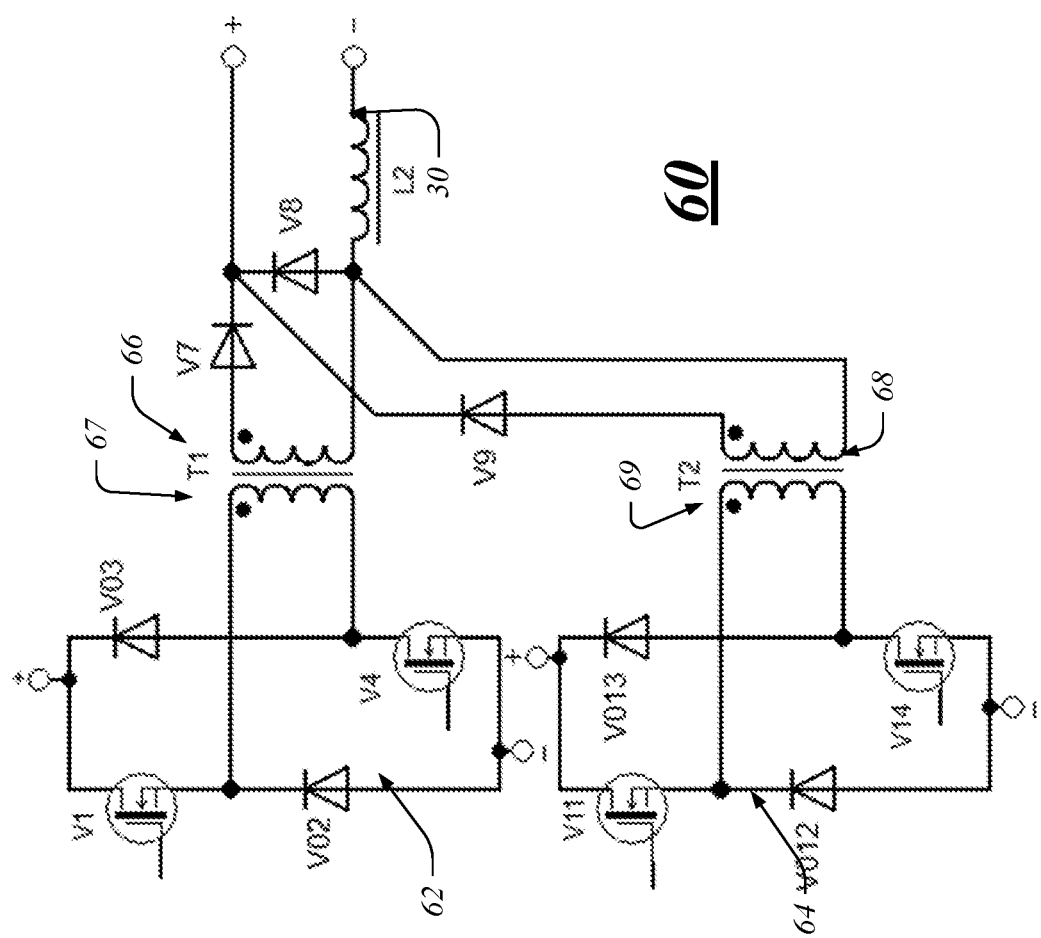
FIG. 6 depicts a circuit diagram of another exemplary apparatus.

FIG. 6 shows a circuit diagram of a power supply 60 according to embodiments of the disclosure. In this embodiment the power supply 60 includes, a main DC-AC power converter 62, arranged as a two-switch forward converter or other power converter operating with the limited maximum PWM duty cycle. In addition, the power supply 60 includes an auxiliary DC-AC power converter 64, which may be a low power converter also arranged as a two-switch forward converter or other power converter operating with the limited maximum PWM duty cycle. The auxiliary DC-AC power converter 64 may operate in different timing phase with respect to the main DC-AC power converter 62. As shown in FIG. 4, the main DC-AC power converter 62 is coupled to a main converter transformer T1 and the auxiliary DC-AC power converter 64 is coupled to the auxiliary converter transformer T2. The main converter transformer T1 may include main primary windings 67 and main secondary windings 66, while the auxiliary converter transformer T2 includes auxiliary secondary windings 69 and auxiliary secondary windings 68. As shown, the main secondary winding is connected to the main rectifier V7 and the auxiliary secondary winding is connected to the auxiliary rectifier V9. Outputs of the rectifiers are connected in parallel. According to its principle of operation, this embodiment contains free-wheeling rectifier V8 on the output. As in the embodiments of FIG. 4 and FIG. 5, additional voltage output through the auxiliary converter transformer T2 may be harnessed under low current conditions to increase the voltage output, as generally shown in FIG. 1.

Figure 7:
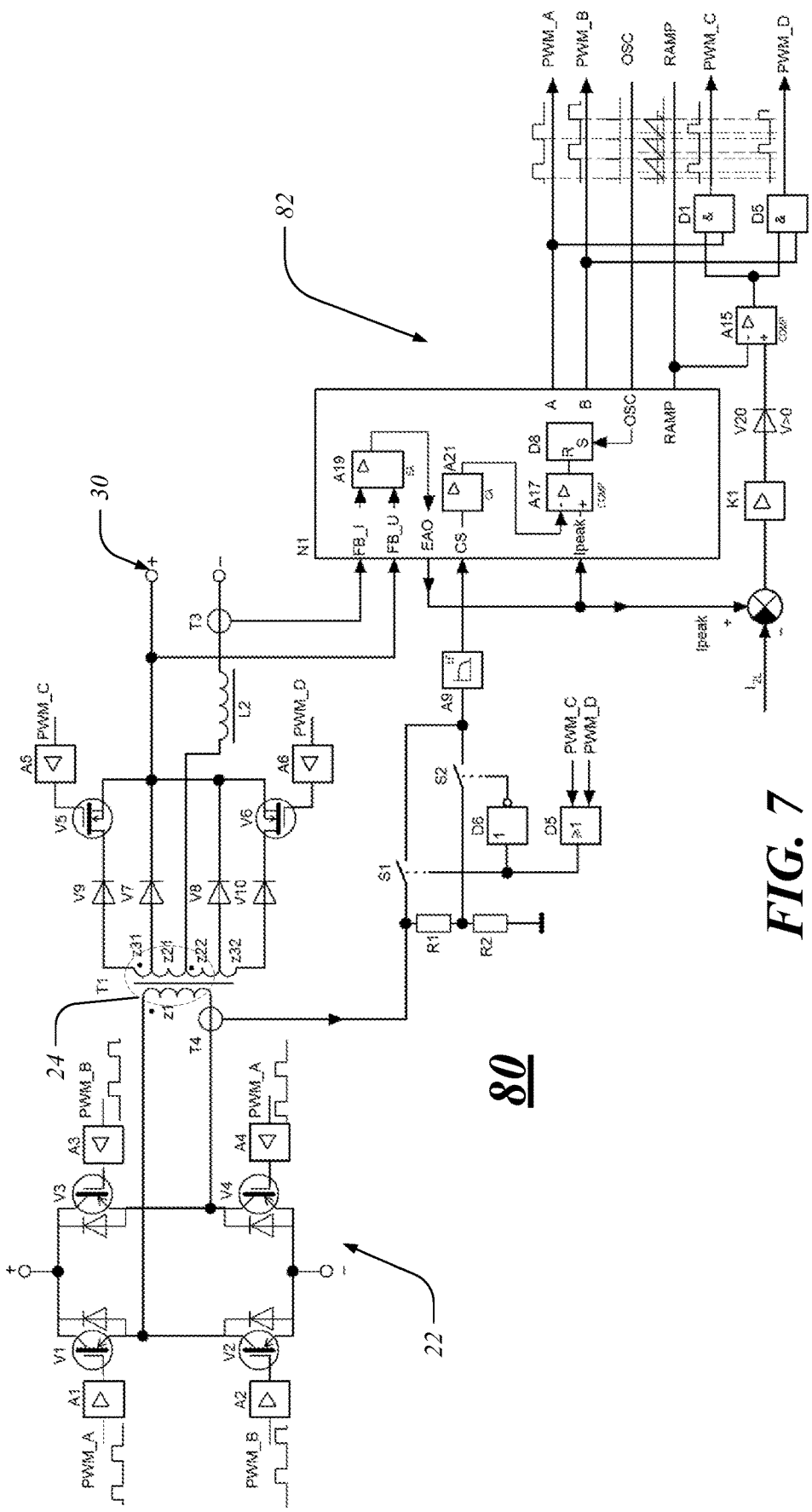
FIGS. 7-18 depict circuit diagrams of exemplary systems according to different embodiments of the disclosure.

FIG. 7 shows a circuit diagram of a power supply 80 according to additional embodiments of the disclosure. The power supply 80 may be arranged generally as shown in FIG. 2, with an additional exemplary control circuit, shown as control circuit 82. As generally discussed above, control of the main converter, DC-AC power converter 22, may be provided using PWM control, in where the lagging edge of a pulse is used to control the output from the DC-AC power converter 22. Additionally, the secondary switches V5, V6 may be controlled using modulation of the leading edge of a pulse. This control is generally shown in the control circuit 82 that outputs a PWM_A signal, corresponding to a PWM signal having phase A, where the lagging edge is modulated. This signal may be sent to the switch V1 and switch V4, as shown. The control circuit 82 also outputs a PWM_B signal, corresponding to a PWM signal having phase B, where the lagging edge is also modulated. This signal may be sent to the switch V2 and switch V3, as shown. As suggested in FIG. 7, the phase of the PWM_B signal and PWM_A different from one another so the switches V1 and V4 are in an OFF state when the switches V2 and V3 are in an ON state, and the switches V2 and V3 are in an OFF state when the switches V1 and V4 are in an ON state.

As further illustrated in FIG. 7 the control circuit 82 may output a PWM_C signal, corresponding to a PWM signal having phase A, where the lagging edge and leading edge are modulated. This signal may be sent to the secondary switch V5, as shown. The control circuit 82 also may output a PWM_D signal, corresponding to a PWM signal having phase B, where the leading edge and lagging edge are also modulated. This signal may be sent to the secondary switch V6 as shown. As suggested in FIG. 7, the phase of the PWM_C signal and PWM_D signal may differ from one another, in particular they complementary phases, similarly as signal PWM_A and PWM_B.

Additionally, as further discussed below the control circuit 82 may include a component(s) acting as a variable time delay generator. The control circuit 82 may also include control circuit includes logic and memory elements.

In order to adjust the level of voltage output to the weld station 30, the control circuit 82 may adjust operation of a set of primary switches, where the set of primary switches may include at least one primary switch, as exemplified by the primary switches V1, V2, V3, V4; and the control circuit may adjust operation of a set of secondary switches where the set of secondary switches may include at least one secondary switch, as exemplified by of the secondary switches V5 and V6, in accordance with a sensed current. As shown in FIG. 5, the power supply 80 may include a primary current sensor T4 arranged to measure a primary current output by the DC-AC power converter 22, and to generate a primary current sense signal. The primary current sense signal may be used to adjust the activation of primary switches V1, V2, V3, V4 by the principle of peak current mode control. The reference current Ipeak for the peak current mode control may be used to adjust the activation of secondary switch V5 and secondary switch V6. For example, since the leading edge of the PWM_C signal and PWM_D signal, sent to secondary switch V5 and V6, respectively, may be modulated by a controlled time delay, resulting in a variable time delay. The time delay may be adjusted according to the output current in the following manner. As the current increases, the reference peak current also increase, and consequently the variable time delay may increase so that the variable time delay becomes greater than one half of the switching period of the PWM_A signal and PWM_B signal at a first threshold value (see $I_{2H}$ of FIG. 1).

This results in the secondary switch V5 and V6 not being activated at all. In this manner, just the voltage output by the first set of secondary windings z21 and z22 is delivered to the weld station 30, through the rectifiers V7, V8. The maximum voltage can reach the level as represented by $V_{2L}$ (FIG. 1). Below the first threshold value the variable time delay may decrease along with decreased level of output current value down to second threshold value (see $I_{2L}$ of FIG. 1). In the current regime between $I_{2H}$ and $I_{2L}$, a given reduction in current results in a given reduction of time delay where the given reduction in time delay increases activation of the secondary switch V5 and secondary switch V6. This increased activation results in a larger value of voltage drawn from the auxiliary set of secondary windings 26, thus increasing the voltage output to the weld station 30. Below a current corresponding to the second threshold value $I_{2L}$, the time delay for activating the secondary switch V5 and secondary switch V6 may become zero, so the secondary switch V5 and secondary switch V6 may be activated without delay or permanently and simultaneously conducting. In this low current regime, the operation of secondary switches (V5-V6) may be not directly dependent of the current value and the maximum voltage output may remain on the high level over a range of current down to zero current.

Notably, the application of secondary switches in the power supply 80 may result in instant or very fast change of the transformer ratio during the active phase of the power conversion. The current in the switches V1-V4 of the DC-AC power converter 22 is accordingly changing rapidly. When a peak current mode control is applied, for PWM and for the control of the transformer core saturation, this rapid change of current may interrupt the control principle, reducing operation stability of the DC-AC power converter 22.

To address this issue, in the power supply 80 of FIG. 7, the primary current sense signal may be attenuated dynamically during the ON phase of the secondary switches V5 and V6. In the particular embodiment, the current sense is attenuated proportionally to the ratio between the main secondary winding and the main plus auxiliary secondary windings. The current sense signal may be disturbed, while after filtering may be still available for control of the operation of the power supply 80.

To address this issue, in other embodiments, the transformer stage 42 may be substituted for two transformers such as in the power supply 40. In this manner the presence of a separate auxiliary transformer with two secondary windings allows a primary current sensor to deliver current without rapid change. A drawback of this latter configuration is that when the auxiliary converter transformer T2 is not being used, a magnetization current still circulates, resulting in additional losses and there is no secure protection against the saturation of the transformer T2.

In various embodiments, the lagging edge of PWM signals controlling secondary switches may be modulated in the same way as for switches of a main converter, by the same control principle. Notably, just using modulation of the leading edge of PWM signals in the secondary switches may often be more effective. In this case the secondary switch may be switched off at some interval after the beginning of the opposite phase; thus the switching off process may be carried out with no current (zero current switching ZCS)

Figure 8:
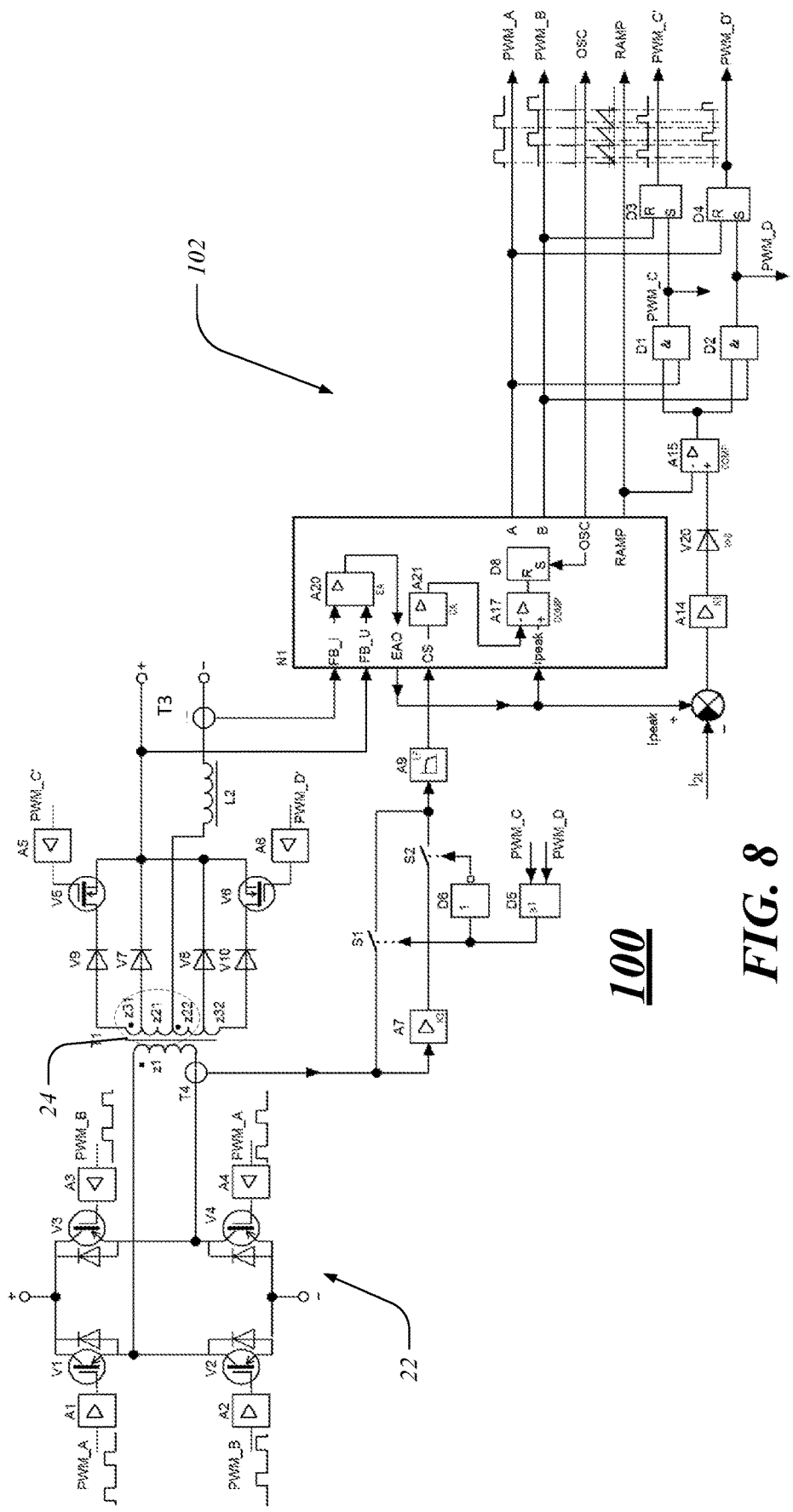

FIG. 8 shows a circuit diagram of a power supply 100 according to further embodiments of the disclosure. The power supply 100 may be arranged similarly to power supply 80, save for some differences including the differences discussed below. In particular, the power supply 100 includes a control circuit 102 having a set of RS flip-flops, shown as RS triggers D3, D4. The triggers are arranged to provide exclusively leading edge modulation for control of secondary switch V5 and secondary switch V6, to provide zero current switching off. As shown in FIG. 8, for example, the output from D3 is a PWM_C' signal, representing a leading edge modulated PWM signal of phase A, where this signal is received by the secondary switch V5. Similarly, the output from D4 is a PWM_D' signal, representing a leading edge modulated PWM signal of phase B, where this signal is received by the secondary switch V6. In order to secure zero current switching of the V5 and V6 secondary switches, the lagging edges of the PWM_C' and PWM_D signals may be further extended. The lagging edge may be further delayed over the beginning of the PWM signals of a phase A and a phase B. In different embodiments, those delays may be fixed or may be current-dependent delay. In a further variant the zero current switching control may employ current sensing or voltage sensing and additional control logic.

Figure 9:
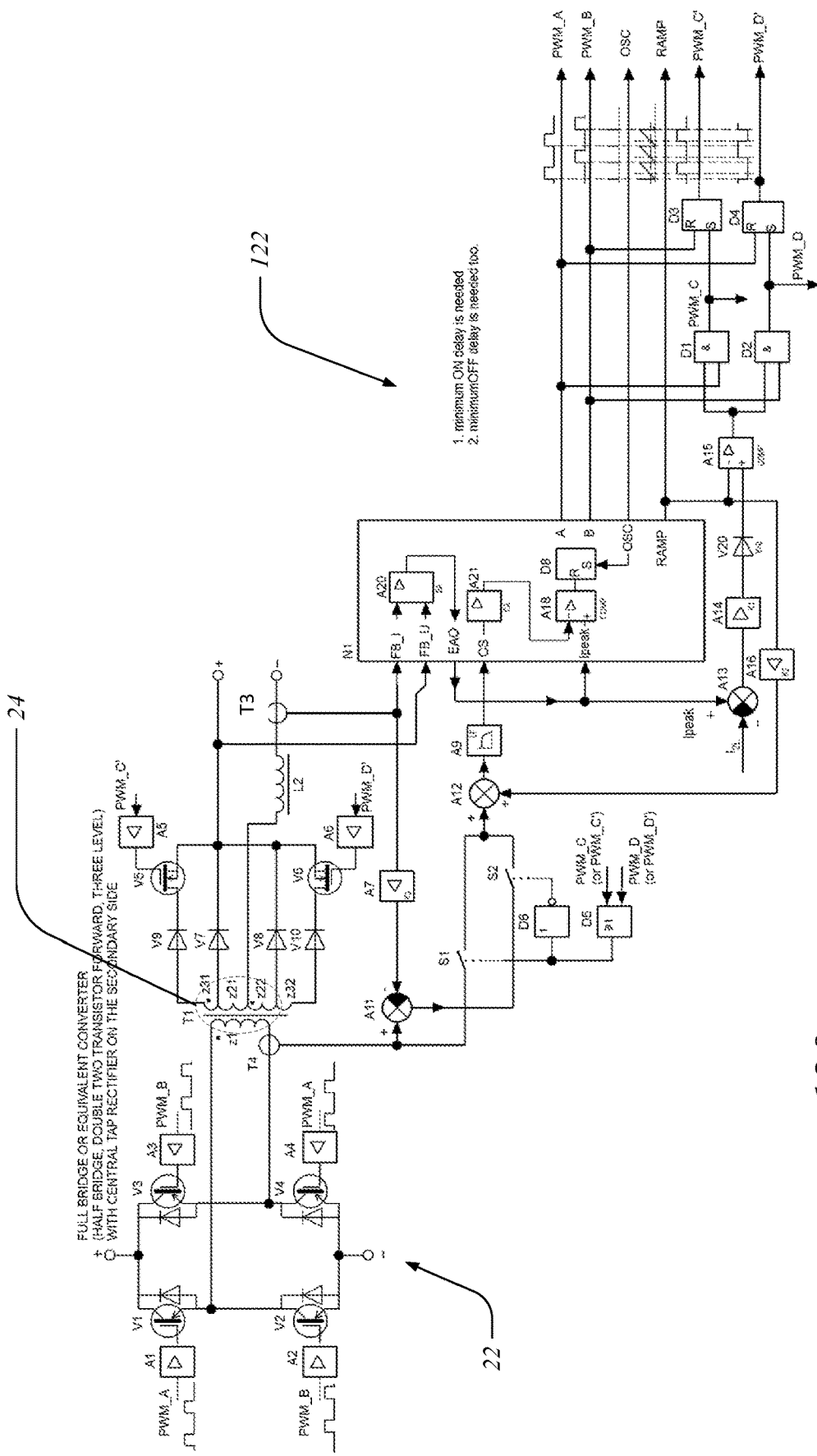

FIG. 9 shows a circuit diagram of a power supply 120 according to further embodiments of the disclosure. The power supply 120 may be arranged similarly to power supply 80 or power supply 100, save for some differences including the differences discussed below. In addition to the control circuit 122, a distinguishing feature of the power supply 120 is the circuitry that provides for a primary current sense signal to be combined with a secondary current sense signal during the ON phase of the secondary switches, that is, the secondary switch V5 and secondary switch V6. As illustrated, a summing node A11 is arranged to receive a primary current sense signal from primary current sensor T4 and is also arranged to receive a secondary current sense signal from secondary current sensor T3. The summing node A11 may add these signals together during the ON phase of secondary switch V5 or secondary switch V6. The current sense signal may be disturbed, while after filtering may be used for control of the operation of the power supply 120.

Figure 10:
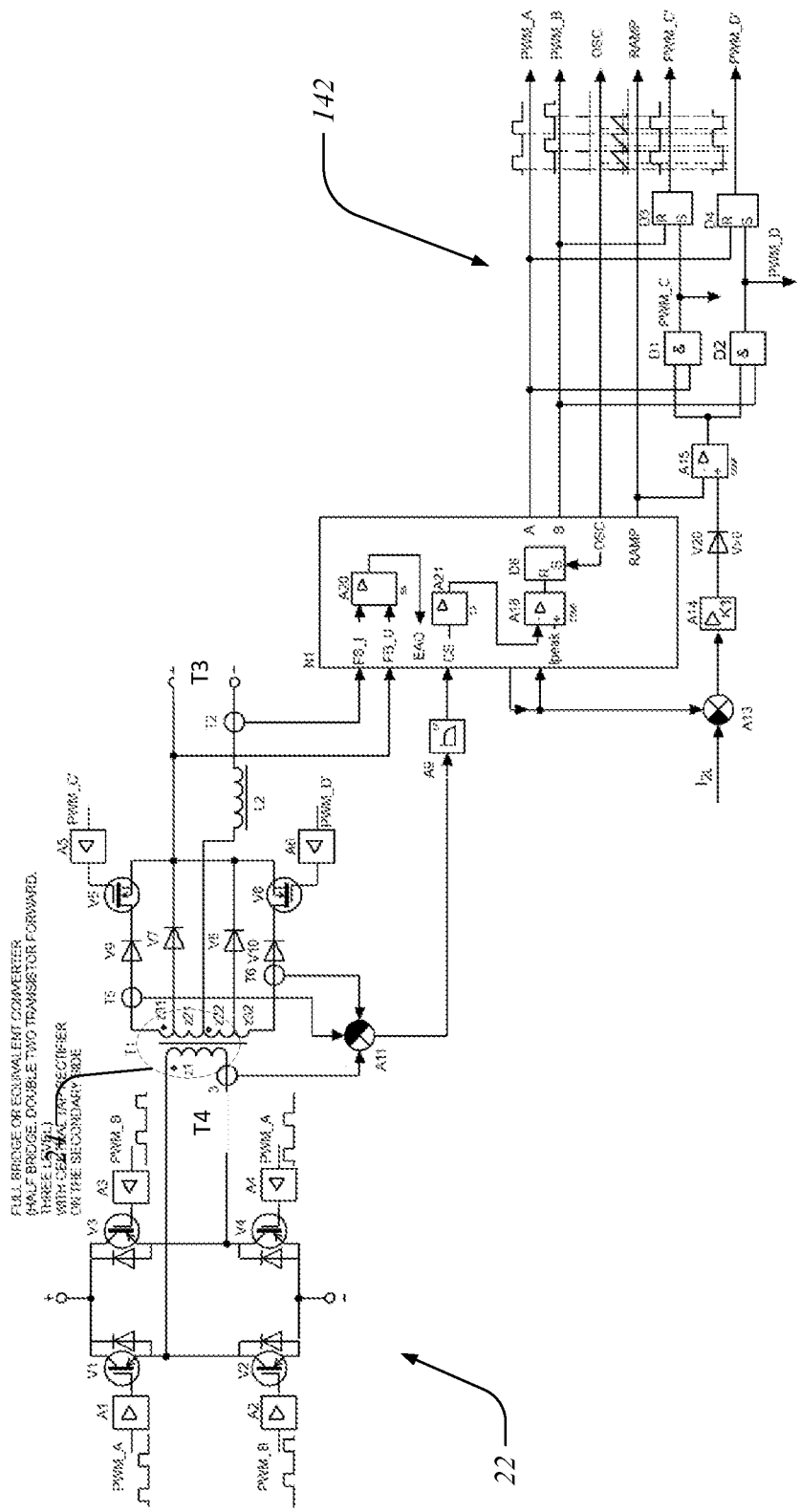

FIG. 10 shows a circuit diagram of a power supply 140 according to further embodiments of the disclosure. The power supply 140 may be arranged similarly to power supply 80 or power supply 100, or power supply 120, save for some differences including the differences discussed below. In particular, the power supply 140 includes a control circuit 142 and a pair of secondary auxiliary current sensors, shown as sensor T5 and sensor T6. The sensor T5 is arranged to sense current between the auxiliary windings of the secondary side of transformer stage 24 and the secondary power switch V5. The sensor T6 is arranged to sense current between the auxiliary windings of the secondary side of transformer stage 24 and the secondary power switch V6. The sensor T6 and sensor T5, as well the primary current sense signal and the current sense signals from sensor T6 and sensor T5 may be combined. This provides a straightforward manner to control voltage output by the transformer stage 24 in a feedback loop by measuring g primary current as well as the auxiliary secondary current.

Figure 11:
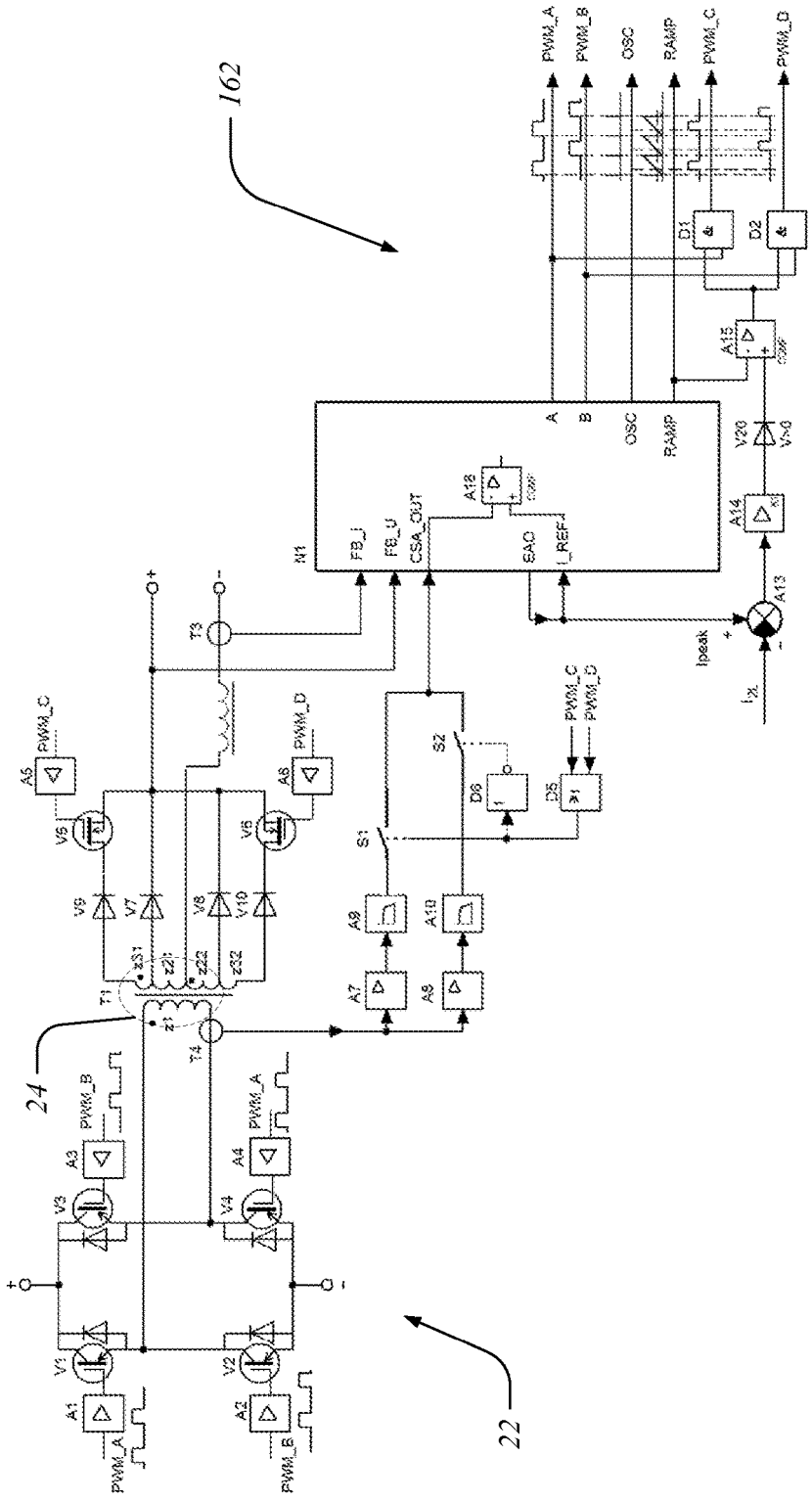

FIG. 11 shows a circuit diagram of a power supply 160 according to further embodiments of the disclosure. The power supply 160 may be arranged similarly to power supply 80 or power supply 100, or power supply 120, or power supply 140, save for some differences including the differences discussed below. In particular, in the control circuit 162, signal switching may be applied after filtering. For example, the control circuit 162 may include a filter component, shown as a current sense low pass filter A9, and a current sense low pass filter A10 between the voltage controlled switch S1 and voltage controlled switch S2, respectively and primary current sensor T4.

Figure 12:
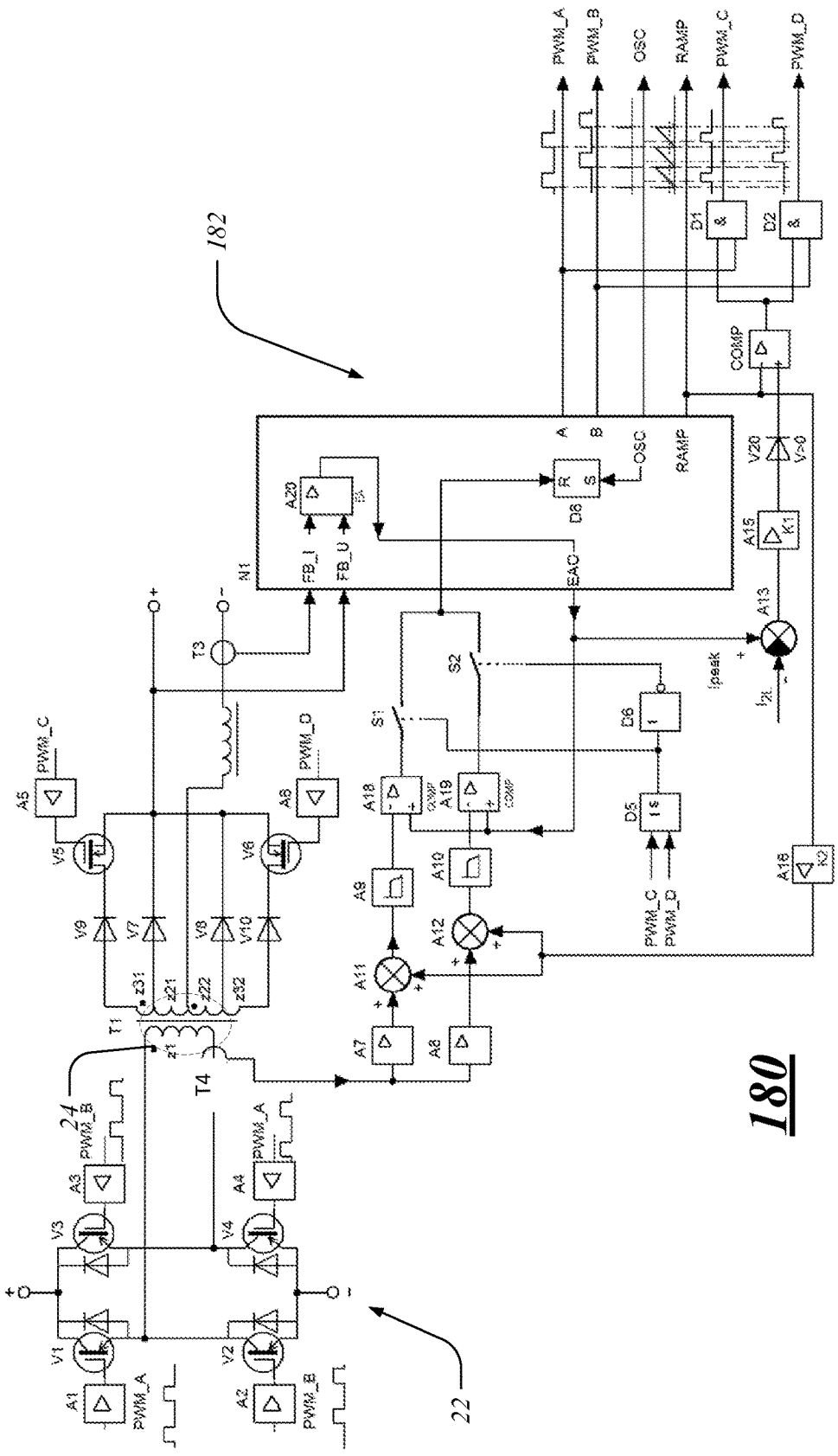

FIG. 12 shows a circuit diagram of a power supply 180 according to further embodiments of the disclosure. The power supply 180 may be arranged similarly to power supply 80 or power supply 100, or power supply 120, or power supply 140, or power supply 160 save for some differences including the differences discussed below. In particular, in the control circuit 182, two PWM comparators are provided, shown as the lagging edge modulation comparator A18 and lagging edge modulation comparator A19.

In all aforementioned embodiments, to create the variable time delay of the leading edge PWM modulation for the operation of the secondary switches, a threshold current value, the threshold current reference proportional to the current level $I_{2L}$ (FIG. 1), is subtracted from the peak current reference Ipeak in the summing node A13, and after amplification or attenuation, given to the comparator A15 to create adequate delayed signal by means of the comparison with certain ramp signal.

Figure 13:
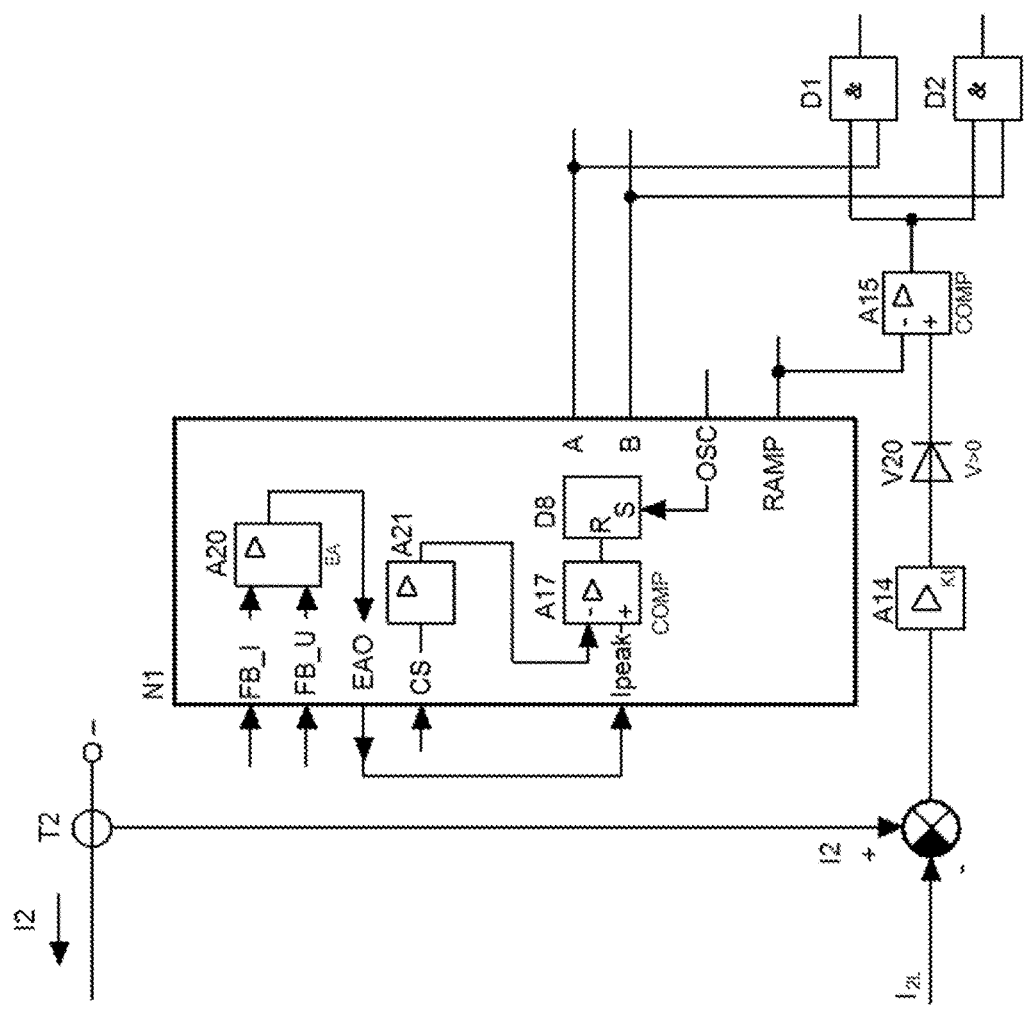

FIG. 13 shows an alternative embodiment of performing current sense that may be applied in conjunction with the circuitry and techniques of the aforementioned embodiments. The threshold current reference proportional to the current level $I_{2L}$ (FIG. 1) is subtracted from the secondary current sense value Its proportional to the secondary current I2 in the summing node A13, then after amplification or attenuation, given to the comparator A15 to create adequate delayed signal by means of the comparison with certain ramp signal.

Figure 14:
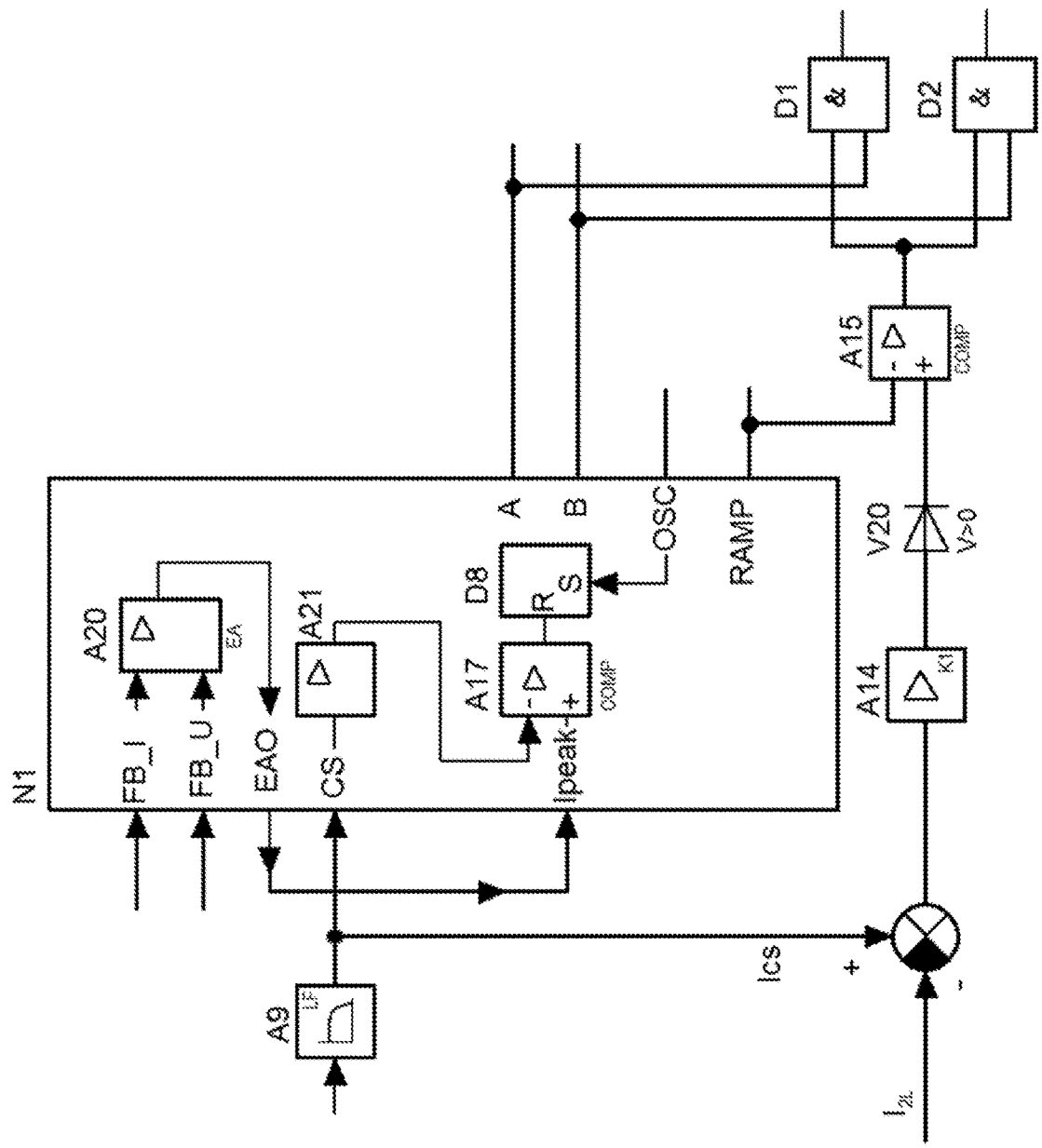

FIG. 14 shows a further embodiment of performing current sense that may be applied in conjunction with the circuitry and techniques of the aforementioned embodiments. In this embodiment, the threshold current proportional to the current level $I_{2L}$ (FIG. 1) is subtracted from the primary current sense value $I_{CS}$ used as an input for peak current mode control, in the summing node A13, then after amplification or attenuation, given to the comparator A15 to create adequate delayed signal by means of the comparison with certain ramp signal.

In various additional embodiments, signal switching may be applied at any point along the entire circuit of the lagging edge creation, either on analog or discrete signals.

Figure 15:
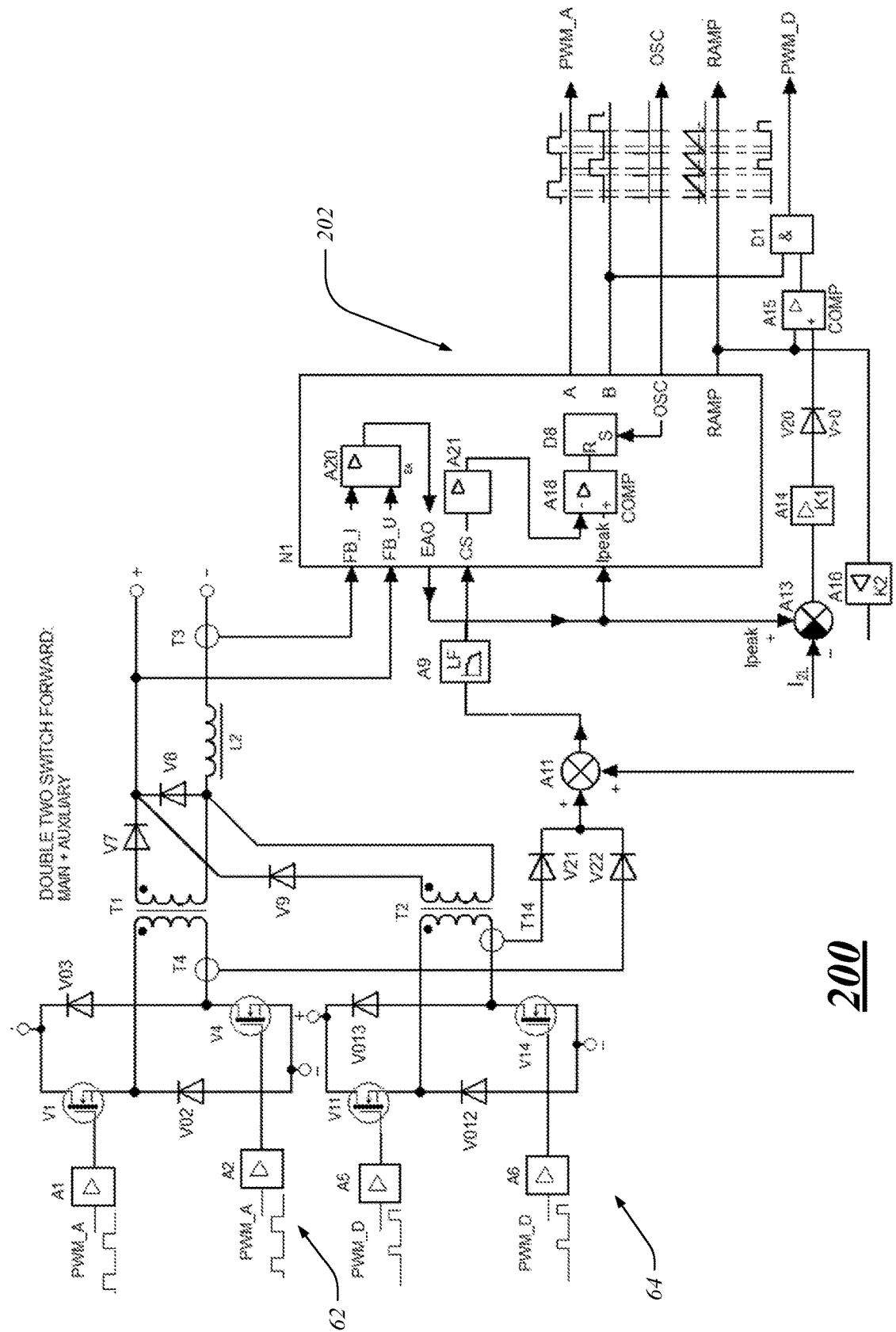

FIG. 15 shows a circuit diagram of a power supply 200 according to further embodiments of the disclosure. The power supply 200 may be arranged similarly to power supply 60 with the addition of the control circuit 202

One novel aspect of the power supply 200 is the way of controlling of a second two-switch forward converter or any type converter operating with limited duty cycle using the modulation of the two pulse edges: lagging edge and leading edge. In particular, in addition to a primary current sensor T4 arranged to measure a primary current output by the main power converter 62, the power supply 200 includes a primary current sensor T14 coupled to measure the current output of the auxiliary DC-DC power converter 64. In keeping with the operation principles discussed previously, the additional converter, the auxiliary power DC-AC converter 64, may not operate at all when the output current from the main power converter 62 is larger than the threshold value $I_{2L}$. An advantage of the present embodiment is the essentially lower power of the auxiliary DC-AC power converter 64. Another advantage is that the auxiliary DC-AC power converter 64 may be enclosed as a separate module, giving a manufacturer the flexibility to produce power supplies with or without the extended voltage characteristic feature.

Figure 16:
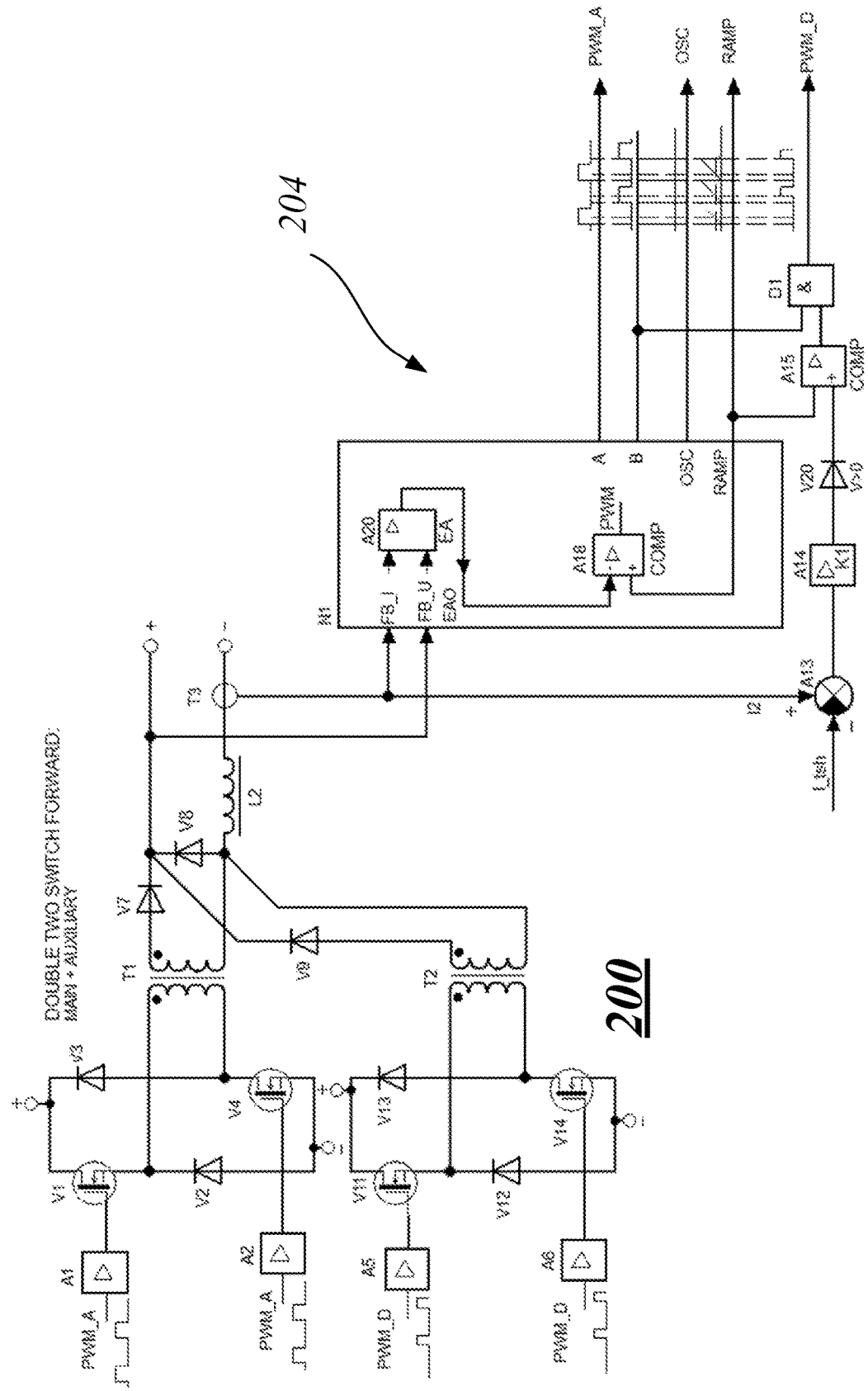

FIG. 16 shows another embodiment where a power supply 200 includes two two-switch forward converters. According to its operating principle, this type of the power converter does not need primary current sense. In such an application the internally generated ramp of the control system 204 is used for leading and lagging edge pulse width modulation.

Figure 17:
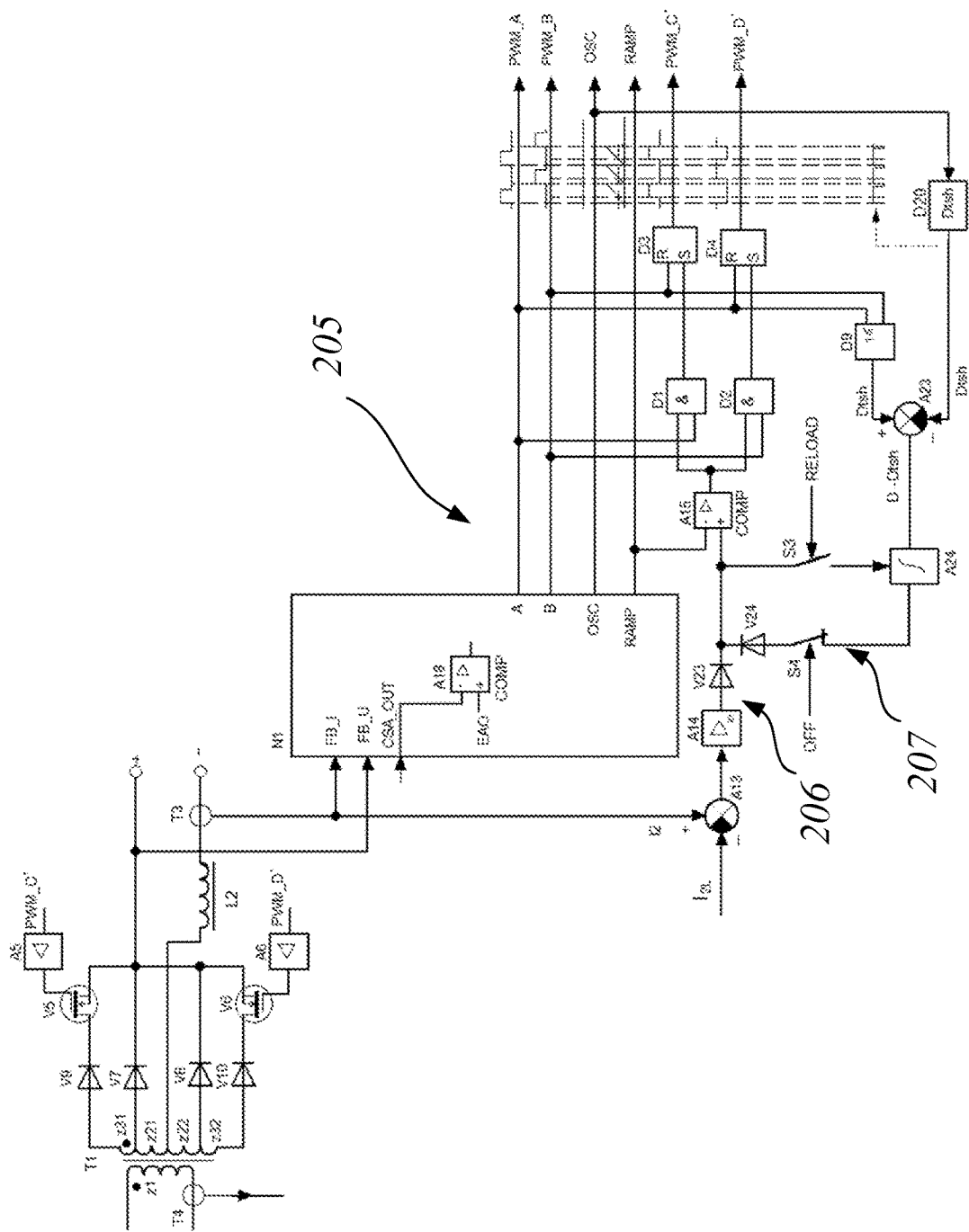

FIG. 17 shows an extension of the control of the leading edge modulation in aforementioned systems, according to a further embodiment. The control system 205 comprises two sources of the signal in the leading edge modulation, including a proportional signal 206 and integral signal 207, which are connected to the input of the comparator A15 in a concurrent way. This is schematically depicted by the implementation of two ideal rectifiers V23 and V24. In various embodiments, this function may be performed according to different solutions effectively performing the same function. In particular, the function may be performed using a number comparison in computer code. The proportional signal 206 is the same as in previous embodiments with the same principle of the operation. Schematically this operation is depicted by the summing node A13 and amplifier/attenuator A14. The integral signal 207 may be created in the additional feedback loop. The actual duty cycle D is compared with a certain threshold value Dtsh in the summing node A23. The difference between those two values may drive the integrator or other astatic regulator A24, and the output of the integrator A24 is the additional source of the signal controlling the leading edge. The integrator A24 may be periodically reloaded with the last value of the delay taken after rectifiers V23 and V24 in purpose to increase the speed of the operation. The operation principle is schematically depicted by implementation of the switch S3. The integrator can be temporarily switched off during the transitions to increase the speed of reaction of the control system. The operation principle is schematically depicted by implementation of the switch S4. For the same purpose a regulator may be cyclically present on different conditional instances.

Figure 18:
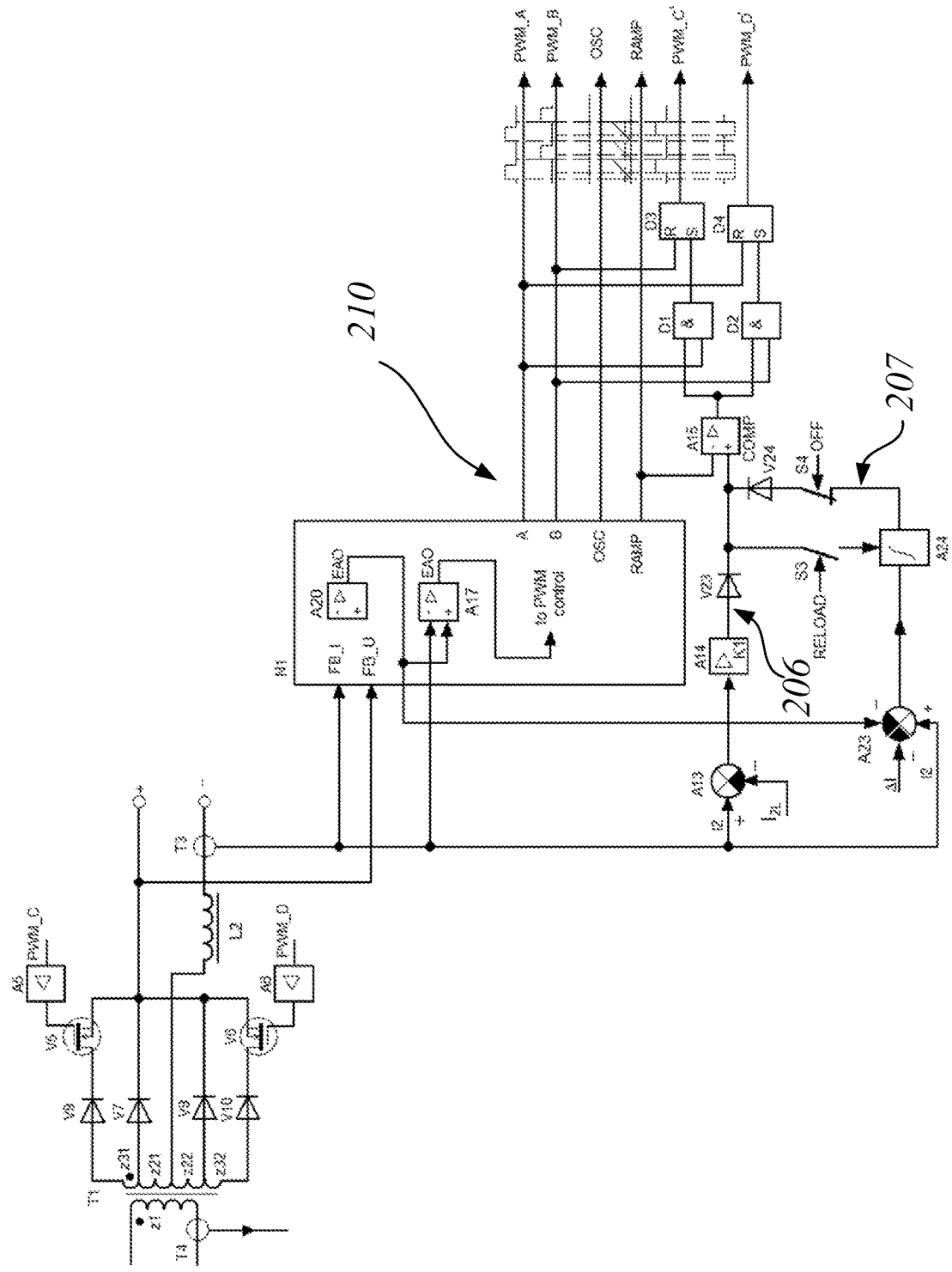

FIG. 18 shows another control circuit 210 for control of the leading edge modulation in aforementioned systems according to an additional embodiment. There are two sources of the signal for the leading edge modulation, a proportional signal 206 and integral signal 207, connected to the input of the comparator A15 in a concurrent manner. The proportional signal 206 is the same as in previous embodiments with the same principle of the operation. The integral signal 207 is created in the additional feedback loop. The summing node A23 have negative input from the average current reference Iav, positive input from the secondary current I2 and the positive input of the certain current offset ΔI. The output of the summing node feeds integrator or other astatic regulator A24, which delivers integral signal 207. To increase the speed of operation, the regulator A24 may be cyclically reloaded with the actual value, as is depicted by operation of the switch S4 and temporarily disabled, as is depicted by operation of the switch S3. For the same purpose regulator may be cyclically present on different conditional instances.

In some embodiments, a variable time delay may be increased by an alternative signal dependent on a value of a load connected to the welding apparatus. In further embodiments, the alternative signal comprises a signal received from a regulator comprising an integrator or other regulator, the regulator being fed by a difference between values of actual duty cycles of the first and second PWM signal and a reference duty cycle value. In additional embodiments, the alternative signal comprises a signal received from a regulator comprising an integrator or other regulator, the regulator being fed by a difference between an actual secondary current and a reference secondary current. In other embodiments the alternative signal may be temporarily switched off or preset to improve a dynamic response of the apparatus. In further embodiments, the alternative signal may be temporarily switched off or preset to improve a dynamic response of the apparatus. In still other embodiments, the alternative signal may be cyclically updated with an actual value of the delay to improve a dynamic response of the apparatus.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. In particular, all embodiments of the controls, described schematically by means of basic functions, may be implemented in a form of computer code or in digital hardware form. Thus, the claims set forth below are to be construed in view of the full breadth and spirit of the present disclosure as described herein.

What is claimed is:

1. An apparatus to provide welding power, comprising:
a direct current-alternate current (DC-AC) power converter to output a primary current;
a transformer stage comprising:
at least one power transformer to receive the primary current from the (DC-AC) power converter on a primary side of the transformer stage and to output a first voltage through a first rectifier and a first set of secondary windings disposed on a secondary side of the transformer stage;
an auxiliary set of secondary windings disposed on the secondary side of the transformer stage to output a second voltage;
a primary current sensor arranged to measure a current on the primary side of the transformer stage and to output a primary current sense signal;
a secondary current sensor arranged to measure a current on the secondary side of the transformer stage and to output a secondary current sense signal; and
a pair of active unidirectional switches disposed on the secondary side of the transformer stage to receive the second voltage from the auxiliary set of secondary windings,
wherein the unidirectional switches are controlled at least in part based on the primary current sense signal and the secondary current sense signal.

2. The apparatus of claim 1, wherein the at least one power transformer comprises a first power transformer having a primary side comprising a set of primary windings, and a secondary side comprising the first set of secondary windings and the auxiliary set of secondary windings.

3. The apparatus of claim 1, wherein the at least one power transformer comprises a main transformer and an auxiliary transformer, wherein the first set of secondary windings is disposed on a secondary side of the main transformer and the auxiliary set of secondary windings is disposed on a secondary side of the auxiliary transformer.

4. The apparatus of claim 1, wherein the primary current sense signal is attenuated during an ON phase of the pair of active unidirectional switches, the apparatus further comprising:
a filter component to filter the primary current sense signal and output a control signal.

5. The apparatus of claim 1, wherein the primary current sense signal is combined with the secondary current sense signal during an ON phase of the pair of active switches.

6. The apparatus of claim 1, further comprising:
a first auxiliary current sensor disposed between a first end of the auxiliary set of secondary windings and a first switch of the pair of active switches; and
a second auxiliary current sensor disposed between a second end of the auxiliary set of secondary windings and a second switch of the pair of active switches,
wherein the first auxiliary current sensor is configured to output a first current sense signal from the first switch and the second auxiliary current sensor is configured to output a second current sense signal from the second switch.

7. The apparatus of claim 1, further comprising a first voltage controlled switch coupled to the primary current sensor, and a second voltage controlled switch coupled to the primary current sensor.

8. The apparatus of claim 7, further comprising:
a first multiplexer and a first pulse width modulation (PWM) comparator, the first multiplexer and first pulse width modulation (PWM) comparator being disposed between the primary current sensor and the first voltage controlled switch, and
a second multiplexer and a second PWM comparator, the second multiplexer and second PWM comparator being disposed between the primary current sensor and the second voltage controlled switch.

9. The apparatus of claim 1, wherein the DC-AC converter comprises a full bridge converter or converter equivalent to a full bridge converter, wherein the transformer stage comprises a first set of primary switches to receive a first PWM signal, and second set of primary switches to receive a second PWM signal.

10. The apparatus of claim 9, further comprising a first secondary switch to receive a third PWM signal and a second secondary switch to receive a fourth PWM signal.

11. The apparatus of claim 10, further comprising a control circuit, the control circuit including a pulse width modulator to output the first PWM signal and the second PWM signal.

12. The apparatus of claim 11, wherein the control circuit includes a variable time delay generator synchronized with the pulse width modulator.

13. The apparatus of claim 12, wherein the control circuit includes logic and memory elements coupled to the first PWM signal and second PWM signal and to the variable time delay generator to output the third PWM signal and the fourth PWM signal.

14. The apparatus of claim 12, wherein the control circuit is configured apply modulation of a leading edge of the third PWM signal and fourth PWM signals, and wherein lagging edges of the third PWM signal and fourth PWM signal are generated by the first PWM signal and second PWM signal at a constant delay or a current-dependent delay.

15. An apparatus to provide welding power, comprising:
a main DC-AC power converter, the main DC-AC power converter having a first output;

a main power transformer coupled to receive the first output at main primary windings of the main power transformer and to generate a main power output through main secondary windings of the main power transformer;

an auxiliary DC-AC power converter, the auxiliary DC-AC power converter having a second output; and an auxiliary power transformer coupled to receive the second output at auxiliary primary windings of the auxiliary power transformer, and to generate an auxiliary power output through auxiliary secondary windings of the auxiliary power transformer, wherein the main secondary windings are connected to a main rectifier, wherein the auxiliary secondary windings are connected to an auxiliary rectifier, and wherein the main rectifier and the auxiliary rectifier are electrically connected to provide a combined output, wherein the main DC-AC power converter is a two-switch forward converter, and the auxiliary DC-AC power converter is a two-switch forward converter.

16. The apparatus of claim 15, wherein the main DC-AC power converter is configured to operate with PWM control of a lagging edge of an active energy transfer pulse, wherein the auxiliary DC-AC power converter is configured to operate with PWM control of lagging and leading edges of an active energy transfer pulse, and the auxiliary DC-AC power converter is configured to receive a set of PWM signals having a first phase and the main DC-AC power converter is configured to receive a set of PWM signals having a second phase opposite the first phase.

17. A method of controlling welding power in a welding apparatus, comprising:

sending a first pulse width modulation (PWM) signal and a second PWM signal to a DC-AC power converter, the first PWM signal and second PWM signal controlling a first set of primary switches and a second set of primary switches to output a primary current to a primary side of a main power transformer stage;

measuring one of: a secondary average current, primary current or peak current reference from an inner feedback in the DC-AC power converter to generate a sensed current value; and when the sensed current value is below a first threshold current value, activating a first secondary switch and a second secondary switch disposed on a secondary side of the main power transformer stage.

18. The method of claim 17, wherein the first set of primary switches and second set of primary switches are controlled by modulation of a lagging edge of the first PWM signal and second PWM signal, and wherein the first secondary switch and second secondary switch are controlled by modulation of a leading edge of a third PWM signal and a fourth PWM signal, or by the modulation of the leading edge and modulation of a lagging edge of the third PWM signal and the fourth PWM signal.

19. The method of the claim 18, wherein the third PWM signal begins during an active phase of the first PWM signal and wherein the fourth PWM signal begins during an active phase of the second PWM signal, respectively.

* * * * *